US011393061B2

(12) United States Patent
Al-Sulaiman et al.

(10) Patent No.: US 11,393,061 B2
(45) Date of Patent: Jul. 19, 2022

(54) SYSTEM AND METHOD FOR DETERMINING AN AMOUNT OF CORRELATION BETWEEN NON-ORTHOGONAL VECTORS CHARACTERIZING CURRICULA PARTICIPATION

(71) Applicant: Imam Abdulrahman Bin Faisal University, Dammam (SA)

(72) Inventors: Abdulsalam Abdullah Al-Sulaiman, Dammam (SA); Ebtesam Abdullah Al-Suhaimi, Dammam (SA); Hind Ahmed Al-Rubaish, Dammam (SA); Omaima Alabdullatif, Dammam (SA); Fatiamh Alzahrani, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 584 days.

(21) Appl. No.: 15/399,101

(22) Filed: Jan. 5, 2017

(65) Prior Publication Data

US 2018/0189911 A1  Jul. 5, 2018

(51) Int. Cl.
*G06Q 50/20* (2012.01)
*G06Q 10/10* (2012.01)

(52) U.S. Cl.
CPC ......... *G06Q 50/2053* (2013.01); *G06Q 10/10* (2013.01)

(58) Field of Classification Search
CPC ...... G06Q 10/10; G06Q 40/123; G06Q 50/10; G06Q 50/20; G06Q 50/2053; G06Q 50/01;

(Continued)

(56) References Cited

U.S. PATENT DOCUMENTS 7,321,858 B2  1/2008  Andino, Jr et al.
7,885,900 B1  2/2011  Bender (Continued)

OTHER PUBLICATIONS

George Bebis, Matrix Algebra Review (Jun. 6, 2010), https://www.cse.unr.edu/~bebis/CS485/Handouts/matrixAlgebraReview.pdf (Year: 2010).*

(Continued)

*Primary Examiner* — Andrew B Whitaker
(74) *Attorney, Agent, or Firm* — Oblon, McClelland, Maier & Neustadt, L.L.P.

(57) ABSTRACT

Systems and methods for determining an amount of correlation between non-orthogonal vectors characterizing quantified curricula participation include generating a prioritization matrix for the scholarship including entries associated with ideal characteristics of scholarship applicants; generating an applicant attribute vector characterizing attributes of an applicant extracted from the application; calculating a product for each entry of the prioritization matrix by multiplying corresponding entries of the prioritization matrix and the applicant attribute vector; applying a weighting factor to the product for each entry of the prioritization matrix resulting in weighted products for each entry of the prioritization matrix; accumulating the weighted products into an applicant quality score indicating an amount of correlation between the prioritization matrix and the applicant attribute vector; transmitting an enhanced data packet to another computing device including the applicant attribute vector, the prioritization matrix, or the applicant quality score; and calculating a remaining scholarship budget.

21 Claims, 21 Drawing Sheets

(58) Field of Classification Search
CPC .............. G06Q 10/1053; G06F 16/958; G06F 16/9535; G06F 16/248
USPC .................................................. 705/320, 327
See application file for complete search history.

(56) References Cited

U.S. PATENT DOCUMENTS

| | | | | |
|---|---|---|---|---|
| 8,560,333 | B2* | 10/2013 | Andino, Jr | G06Q 10/10 |
| | | | | 705/1.1 |
| 2003/0163402 | A1* | 8/2003 | Kincart | G06Q 40/06 |
| | | | | 705/36 R |
| 2008/0183731 | A1 | 7/2008 | Gilbert | |
| 2008/0270166 | A1 | 10/2008 | Morin et al. | |
| 2009/0307237 | A1* | 12/2009 | Britton | G06Q 10/10 |
| 2012/0254056 | A1* | 10/2012 | Max | G06Q 40/02 |
| | | | | 705/327 |
| 2013/0030923 | A1* | 1/2013 | Carroll | G06Q 30/02 |
| | | | | 705/14.66 |
| 2014/0040156 | A1* | 2/2014 | Carroll | G06Q 50/20 |
| | | | | 705/327 |
| 2014/0149302 | A1* | 5/2014 | Zuccolillo | G06Q 10/1053 |
| | | | | 705/321 |
| 2014/0279643 | A1* | 9/2014 | Ye | G06Q 50/2053 |
| | | | | 705/327 |
| 2015/0095253 | A1* | 4/2015 | Lim | G06Q 10/00 |
| | | | | 705/327 |
| 2015/0106377 | A1 | 4/2015 | Sri et al. | |
| 2015/0149379 | A1* | 5/2015 | Dearmon | G06Q 50/205 |
| | | | | 705/326 |
| 2015/0294429 | A1* | 10/2015 | Williams | G06Q 50/01 |
| | | | | 705/319 |
| 2015/0347954 | A1* | 12/2015 | Stern | G06Q 10/063112 |
| | | | | 705/7.14 |
| 2016/0125561 | A1* | 5/2016 | Gray | G06Q 50/2053 |
| | | | | 705/327 |

OTHER PUBLICATIONS

U.S. Appl. No. 15/399,101 NPL—EIC 3600 Search Report dated Jun. 24, 2019 (Year: 2019).*
U.S. Appl. No. 15/399,101 NPL—EIC 3600 Search Report dated Feb. 4, 2020 (Year: 2020).*
"HRB Summer Student Scholarships (SS) 2014", Health Research Board, URL: http://www.hrb.ie/uploads/...hrbgrants/SS_Applicant_Guidance_Notes_2014.pdf, Total 21 Pages, (2014).

* cited by examiner

Scholarship Application

Biomedical Engineering Scholarship 99999999 Application

Biographical Information
- Name
- Gender
- Birth date
- Identification Number
- Ethnicity
- University

Academic Information
- Semesters until graduation
- Major
- Major GPA
- Research Focus
- Rank in Major
- Total GPA
- Overall Class Rank

Other Information
- Community Service
- Extracurricular Activities
- Personal Statement Attach additional documentation here Submit

SYSTEM AND METHOD FOR DETERMINING AN AMOUNT OF CORRELATION BETWEEN NON-ORTHOGONAL VECTORS CHARACTERIZING CURRICULA PARTICIPATION

BACKGROUND

Scholarship awarding institutions, such as universities, are often under a large administration burden when it comes to processing and awarding scholarships. In some cases, thousands of applicants can apply for a single scholarship, which makes identifying the best scholarship candidates very arduous. As recognized by the present inventors, passing data for scholarship candidate identification can bog down computer networks across campus during time-intense scholarship review periods. Also, in dynamic technological industries, economic, government, and university priorities can be constantly changing, which also makes selecting scholarship awardees challenging.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

The implementations described herein are directed toward systems for enhancing on-campus communications through vector correlation quantification for curricula participation. Also described are systems and methods for determining an amount of correlation between non-orthogonal vectors characterizing quantified curricula participation include generating a prioritization matrix for the scholarship including one or more entries associated with ideal characteristics of one or more scholarship applicants; generating an applicant attribute vector characterizing attributes of an applicant extracted from the application; calculating a product for each entry of the prioritization matrix by multiplying corresponding entries of the prioritization matrix and the applicant attribute vector; applying a weighting factor to the product for each entry of the prioritization matrix resulting in weighted products for each entry of the prioritization matrix; accumulating the weighted products into an applicant quality score indicating an amount of correlation between the prioritization matrix and the applicant attribute vector; transmitting an enhanced data packet to another computing device including the applicant attribute vector, the prioritization matrix, or the applicant quality score; and calculating a remaining scholarship budget.

BRIEF DESCRIPTION OF THE FIGURES

FIG. 5 illustrates a screenshot of a scholarship application user interface screen;

FIG. 14A illustrates a screenshot of a scholarship approver user interface screen;

DETAILED DESCRIPTION

Figure 1:
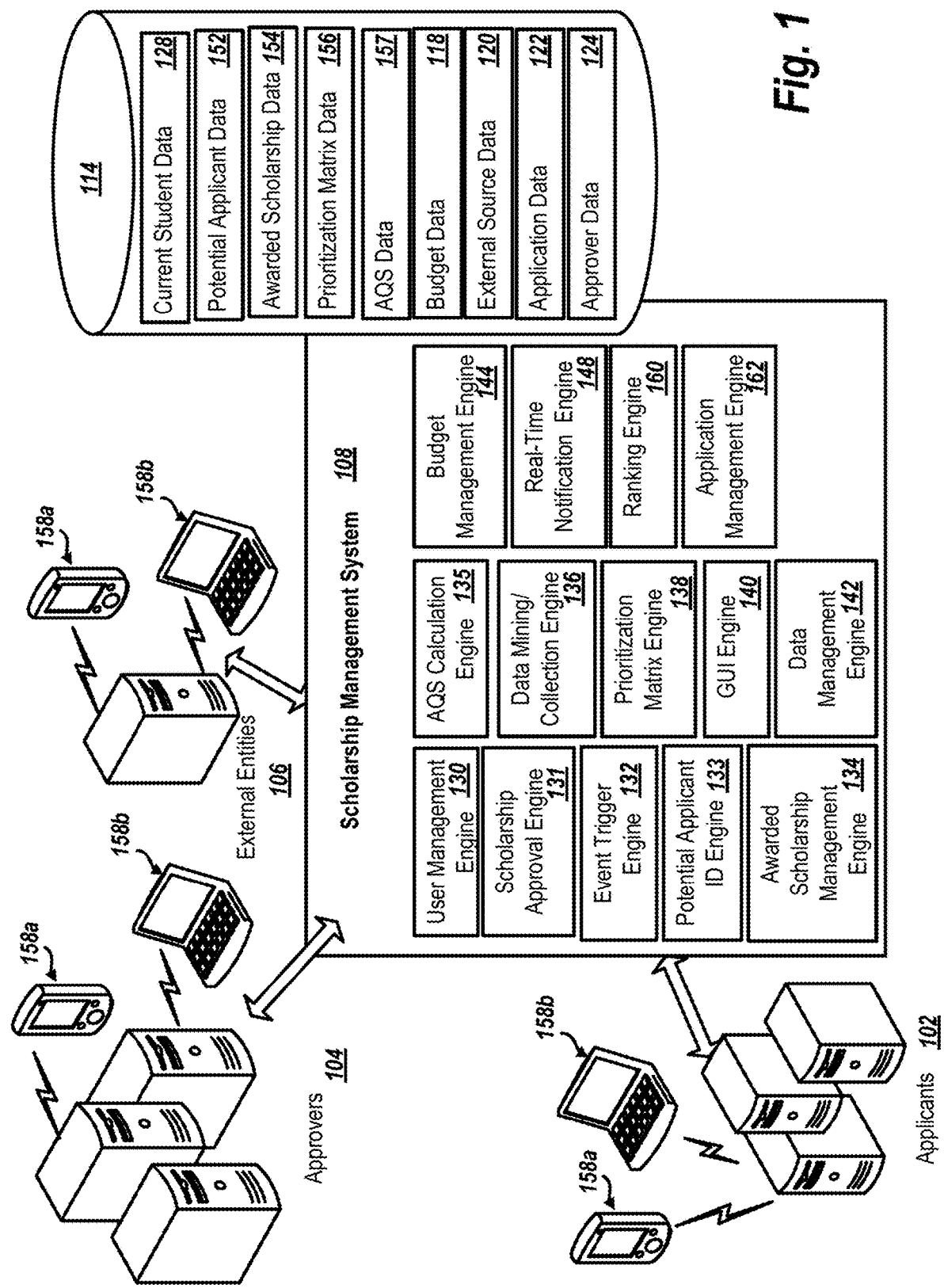
FIG. 1 is a diagram of an example environment for a scholarship management system.

FIG. 1 is a diagram of an example environment 100 for a scholarship management system 108. The diagram illustrates a series of interactions between one or more participants and the scholarship management system 108 which identifies potential applicants for one or more offered scholarships, determines priorities for awarding the scholarships to the applicants based on national, economic, and/or university interests, ranks applicants 102 based on an amount of correlation between the applicants 102 and the priorities, and outputs scholarship awards based on the rankings and/or decisions received from one or more scholarship approvers 104. In some implementations, the scholarship management system 108 can also determine a scholarship award amount for the applicants 102 based on current budget allocations, number of applicants, quality of applicants based on a determined applicant quality score (AQS), and the like. The scholarship management system 108 may be associated with a particular university that awards scholarships or another type of scholarship awarding entity, such as an independently operating research lab, government lab or agency, and the like.

In certain embodiments, the scholarship management system 108 expedites processing and approval of one or more designated applicants having a determined AQS that reflects a high correlation between the applicant and the scholarship priorities. The AQS is a numerical representation of how well the applicant meets predetermined scholarship criteria in addition to the scholarship priorities and can be calculated automatically in real-time in response to receiving a submitted application. Providing expedited processing for the one or more designated applicants improves the speed at which the applications are received, processed, and awarded by one or more processing engines of the scholarship management system 108 because processing applications for the most highly rated applicants before other less highly rated applicants reduces a total number of processed applications. The scholarship management system 108 can also provide real-time feedback to the applicants 102 regarding a likelihood that a particular applicant will be awarded the scholarship in light of the calculated AQS, historical data related to previously awarded scholarships, and AQSs that have been calculated for applicants that have already submitted applications.

The applicants 102 include a plurality of computing devices and databases distributed across a widely dispersed network that may be distributed across a large, international geographic area. The applicant network can be separate and independent from any network associated with any other participant in the scholarship management environment 100, such as external entities 106 or approvers 104. In some implementations, various processing tasks performed by the scholarship application management system 108 can be distributed to computing resources of the submitter network based on processing demands on the computing resources of the scholarship application management system 108. In some implementations, the applicants 102 can include students affiliated with the university awarding the scholarships, either as students, faculty, researchers, etc. In some implementations, the students affiliated with the university awarding the scholarship are referred to as internal applicants. The applicants 102 can also be external applicants that are not currently affiliated with the university awarding the scholarships.

In addition, the data handled and stored by the applicants 102 may be in a different format than the data handled and stored by the other participants of in the scholarship management environment 100. Likewise, the data handled and stored for internal applicants may be in a different format that the data handled and stored by the external applicants. The applicants 102 provide inputs to the scholarship management system 108 that may include potential applicant data 152 indicating an amount of interest the one or more designated applicants have in applying for a particular scholarship as well as application data 122 that is extracted from an electronically-submitted scholarship application. The data provided to the scholarship management system 108 from the applicants 102 may be independent from the other participants and in a different format than the data provided by the external entities 106 and approvers 104.

The approvers 104 include a plurality of computing devices and databases distributed across a widely dispersed network that may be distributed across a large, international geographic area. The approver network can be separate and independent from any network associated with any other participant in the scholarship management environment 100, such as the external entities 106 or applicants 102. In addition, the data handled and stored by the approvers 104 may be in a different format than the data handled and stored by the other participants of in the scholarship management environment 100. In some implementations, various processing tasks performed by the scholarship application management system 108 can be distributed to computing resources of the approver network based on processing demands on the computing resources of the scholarship application management system 108. The approvers 104 provide inputs to the scholarship management system 108 that may include prioritization matrix data 156 that may include ideal applicant characteristics that are considered to be important by the approvers 104. The approvers 104 can also provide inputs to the scholarship management system 108 that included awarded scholarship data 154 indicating which applicants have been approved to receive scholarships as well as budget data 118 indicating a total scholarship budget and/or preferred monetary allocations for each of the awarded scholarships. In some implementations, the approvers 104 include university faculty and leadership that are have a stake in the scholarships awarded to the applicants 102, such as faculty department heads, deans of colleges, dean of graduate studies, a scholarship and training committee chairman, a scholarship and training committee secretary, a director of personnel, a ministry education member, etc. The data provided to the scholarship management system 108 from the approvers 104 may be independent from the other participants and in a different format than the data provided by the external entities 106 and applicants 102. In addition, the approvers 104 can receive data outputs from the scholarship management system 108 with respect to how the applicants 102 were ranked with respect to calculated AQS data 157.

The external entities 106 include a plurality of computing devices and databases distributed across a widely dispersed network that may be distributed across a large, international geographic area. The external entity network can be separate and independent from any network associated with any other participant in the scholarship management environment 100, such as the applicants 102 or approvers 104. In addition, the data handled and stored by the external entities 106 may be in a different format than the data handled and stored by the other participants of in the scholarship management environment 100. In some implementations, the external entities 106 may include an independently operating research lab, government lab or agency, a university that is not affiliated with the scholarship management system 108, or any other entity that has a stake in the scholarships being awarded to the applicants 102 by the scholarship management system 108. In one example, an one of the external entities 106 is an online Safeer system associated with Saudi Arabia's Ministry of Education, which acts as a third party application portal for external applicants applying for scholarships awarded by the scholarship management system 108. The external entities 106 provide inputs to the scholarship management system 108 that may include current student data 128 for external applicants, and external source data 120 that includes data regarding scholarships awarded to students by the external entities 106. The data provided to the scholarship management system 108 from the external entities 106 may be independent from the other participants and in a different format than the data provided by the applicants 102 or approvers 104.

The applicants 102, approvers 104, external entities 106, and data repository 114 can connect to the scholarship application management system 108 through computing devices 158 (e.g., mobile device 158a, computer 158b, or any other type of computing device) via a wired or wireless network (not shown). The network can include one or more networks, such as the Internet and can also communicate via wireless networks such as WI-FI, BLUETOOTH, cellular networks including EDGE, 3G and 4G wireless cellular systems, or any other wireless form of communication that is known.

The scholarship management system 108 includes one or more engines or modules that perform processes associated with identifying prospective scholarships applicants, processing incoming applications, collecting data regarding priorities for awarding the scholarships, routing the applications to the approvers 104, and awarding the scholarships to one or more of the applicants 102. References to the engines or modules throughout the disclosure are meant to refer to software processes executed by circuitry of one or more processing circuits, which can also be referred to interchangeably as processing circuitry. In one example, a user management engine 130 includes one or more processes associated with providing an interface to interact with one or more users (e.g., individuals employed by or otherwise associated with the approvers 104, applicants 102, and/or external entities 106) within the scholarship management environment 100. The processes performed by the engines of the scholarship management system 108 can be executed in real-time in order to provide an immediate response to a system input. In addition, the processes can also be performed automatically in response to a process trigger that can include the reception of data from a data repository, a participant, or another processing engine. For example, the user management engine 130 can control connection and access to the scholarship management system 108 by the approvers 104, applicants 102, and external entities 106 via authentication interfaces at one or more external devices 158 of the approvers 104, applicants 102, and external entities 106.

The scholarship management system 108 also includes a data mining/collection engine 136 that controls the gathering of survey data from the approvers 104, applicants 102, and external entities 106 in real-time. In some implementations, the data mining/collection engine 136 receives data from one or more sources that may have an effect on the generation of a prioritization matrix that is used to determine the AQS for the applicants 102, which indicates the amount of correlation between qualities of the applicants 102 and the priorities associated with awarding the scholarships. For example, the data mining/collection engine 136 can receive automatically and/or continuously updated data associated with national and international industries that correspond to types of scholarships awarded by the scholarship management system 108. For example, the data mining and collection engine 136 can receive automatic updates from government economic agencies related to hiring rates, average salaries, and other statistics that indicate a propensity for economic growth with respect to the industries.

In addition, the data mining/collection engine 136 can perform web crawling processes to access the updated data from one or more websites associated with government and economic priorities and scholarship priorities associated with the external entities 106 and other types of scholarship awarding institutions that can be used to determine data entries and weighting factors for the prioritization matrix that is used to calculate the AQS for the applicants 102. In addition, the data mining/collection engine 136 can receive manually entered information from the participants in the scholarship management environment 100, such as the application data 122 extracted from the electronically-submitted applications as well as scholarship award decisions received from the approvers 104. The data mining/collection engine 136 also monitors websites and/or servers that receive and manage grades, academic performance parameters, and other performance parameters associated for the students at the university or affiliated with the external entities 106, which are updated as current student data 128 stored in data repository 114. For example, the current student data 128 includes academic major, class schedule for each grading period, grades for each class, and other academic or non-academic information.

In addition, the scholarship management system 108 includes a data management engine 142 that organizes the data received by the scholarship management system 108 and also controls data handling during execution of the processes associated with determining designated applicants that meet or exceed a set of highest standards for the one or more scholarships, receiving and processing applications from the applicants 102, ranking the applicants 102 based on the calculated AQS based on a generated prioritization matrix, and routing the applications to the approvers 104 with automatically generated recommendations. In some implementations, the data management engine 142 processes the data received by the data mining/collection engine 136 and loads extracted data to the application data 122, which can be a database of data files of the scholarship applications received from the applicants 102. In addition, the data management engine 142 may perform a data validation/normalization process to configure the received applications into a predetermined format compatible with a format of the files of the application data 122 and ensure that the entries of the received applications have been properly completed.

The data management engine 142 also controls the interaction of the scholarship management system 108 with at least one data repository 114 associated with the scholarship management environment 100. For example, the data management engine 142 can output automatically updated data such as current student data 128 and external source data 120, manually updated data such as the application data 122 to the data repository 114. In some implementations, the data uploaded to the data repository 114 can be either manually or automatically updated. For example, the budget data 118 that indicates how much money is allocated to each scholarship can be automatically determined by the budget management engine 144 based on budgets from previous scholarship cycles or manually determined based on inputs received from the approvers 104. The data management engine 142 can also access any of the data from the data repositories 114 for use by the scholarship management system 108. For example, data generated during the execution of one or more processes by scholarship management system 108 can also be stored in the data repository 114, which can include the prioritization matrix data 156 or the AQS data 157. The data management engine 142 controls the flow of data between the data repository 110 and the scholarship management system 108.

The event trigger engine 132 manages the flow of data updates to the scholarship management system 108. In some implementations, the event trigger data 132 detects updates to the application data 122, current student data 128, prioritization matrix data 156, budget data 118, external source data 120, or any other type of data collected or controlled by the scholarship management system 108. For example, the event trigger engine 132 detects modifications or additions to the files of the application data 122, which may indicate that an new scholarship application has been received. When an update is detected to the application data 122, the event trigger engine 132 loads the updated data files to the AQS calculation engine 135 so that the AQS can be calculated for the applicant submitting the application. The event trigger engine 132 operates in real-time to update the AQS calculation engine 135 when updated application data 122 is received from the applicants 102. The event trigger engine also operates in real-time to update the prioritization matrix data 156 in response to the data mining/collection engine 136 extracting information related to the industries associated with the scholarships, which is part of the external source data 120. The event trigger engine 132 also operates in real-time to update the current student data 128 in response to the data mining/collection engine 136 extracting updated grades for a completed grading period or updates to the current student data 128 that occur as new students enroll or graduated students matriculate. In addition, the event trigger engine 132 operates automatically when updated data is detected by the data/mining and collection engine 136.

In addition, the event trigger engine 132 is configured to detect updates to the data stored in the data repository 114 from the one or more data sources at multiple update velocities. The update velocity of the data corresponds to a rate or frequency at which the scholarship management system 108 receives data updates from the data sources, such as the current student data 128, budget data 118, external source data 120, or application data 122. In addition, the velocities with which individual participants provide data updates may also vary. For example, student grades that are updated in the current student data 128 may be provided quarterly to the scholarship management system 108 at time periods that correspond to a conclusion of a grading period while the application data 122 may provide bi-annually to the scholarship management system 108 when that correspond to times of the year when an application window opens to receive scholarships. Also, the event trigger engine 132 can also be configured to detect unscheduled updates to the data stored in the data repository 114. For example, applications can be received by the scholarship management system 108 at times that do not correspond to a predetermined application window. The event trigger engine 132 can be configured to detect multiple scheduled and unscheduled updates from a multiple data sources in parallel and in real-time.

The scholarship management system 108 also includes a potential applicant identification (ID) engine 133 that identifies potential applicants from the current student data 128 stored in the data repository 114. In some implementations, the current student data 128 includes academic major, class schedule for each grading period, grades for each class, and other academic or non-academic information for students affiliated with the university associated with the scholarship management system 108 as well as external applicants who submitted scholarship applications during previous scholarship cycles through the external entities 106. In one example, the potential applicant ID engine 133 determines whether a preliminary application window has opened, which corresponds to a predefined period of time before a general application window opens when applications are accepted by the scholarship management system 108. The preliminary application window may be several days, a week, a month, several months, etc. before the general application window opens.

If the preliminary application window has opened, the potential applicant ID engine 133 triggers prioritization matrix engine 138 to generate a preliminary prioritization matrix for the scholarship. In some implementations, the preliminary prioritization matrix is an abbreviated version of the prioritization matrix that is used to calculate the AQS for purposes of determining which of the applicants 102 to award scholarships to during an application management process controlled by application management engine 162. For example the preliminary prioritization matrix can include one or more entries associated with biographical, demographic, academic, and non-academic characteristics of applicants that indicate whether or not the applicant may be a good candidate for the scholarship and corresponding weighting factors indicating a relative amount of importance for the entries. Details regarding the generation of the prioritization matrix and corresponding weighting factors by the prioritization matrix engine 138 are discussed further herein.

The potential applicant ID engine 133 also triggers the AQS calculation engine 135 to calculate a preliminary AQS for each of the students represented by the current student data 128 stored in the data repository 114 based on the preliminary prioritization matrix. In some implementations, the current student data 128 is configured into a preliminary applicant attribute vector that is compared to the preliminary prioritization matrix by performing a vector overlap process. Details regarding the functionality of the AQS calculation engine 135 and the vector overlap process are discussed further herein. In response to receiving the calculated preliminary AQSs from the AQS calculation engine 135, the potential applicant ID engine 133 saves the preliminary AQSs in the data repository as AQS data 157 and also triggers ranking engine 160 to rank the potential applicants from highest to lowest preliminary AQS. In some implementations, the ranking as well as a calculated preliminary AQS value are used to identify the students that are most qualified for one or more of the scholarships offered by the scholarship management system 108.

The potential applicant ID engine 133 determines whether or not any potential applicants have been identified based on the calculated preliminary AQSs for the students represented by the current student data 128 as well as the preliminary AQS rankings. In one example, if a total number or total percentage of the students has a preliminary AQS that is greater than a preliminary AQS threshold, then the potential applicant ID engine 133 determines that the potential applicants are the students with AQSs that fall within a top predetermined number of AQSs. For example, if 75% of the preliminary AQSs for a particular scholarship out of a total of 100 students are greater than a predetermined threshold, then the potential applicant ID engine 133 determines that the potential applicants are the top ten ranked students with AQSs that are greater than the preliminary AQS threshold. The potential applicant ID engine 133 also stores the preliminary AQS calculations and corresponding rankings in the data repository 114 as potential applicant data 152.

In response to determining the potential applicants, the potential applicant ID engine 133 automatically triggers graphical user interface (GUI) engine 140 to output scholarship interest inquiries to the applicants 102 that are identified as the potential applicants. The scholarship interest inquiry can be output to the applicants 102 via any type of messaging medium, such as email, text message, notification on webpage or electronic device application, etc. In some implementations, the scholarship interest inquiry is output to the potential applicants to gauge a level of interest a particular potential applicant has in applying for the scholarship. For example, the potential applicant can reply to the scholarship interest inquiry by indicating via one or more input fields on the scholarship interest inquiry message or webpage that he or she is "very interested," "maybe interested," or "not interested." The reply to the scholarship interest inquiry is saved as part of the potential applicant data 152 in the data repository 114 with the corresponding potential applicant's ranking and preliminary AQS. In some implementations, if a potential applicant who has indicated that he or she is "very interested" or "maybe interested" submits an application for the scholarship, that potential applicant's application is flagged for expedited processing and approval.

The scholarship management system 108 also includes an application management engine 162 that processes received applications for scholarships associated with the scholarship management system 108. The scholarship management engine 162 determines whether the general application window has opened, which corresponds to a predetermined number of days, weeks, or months when applications are received by the scholarship management system 108. For example, the general application window may occur between November 2016 and February 2017 for a scholarship commencement date of August 2017.

If the general application window has opened, the application management engine 162 triggers prioritization matrix engine 138 to generate a prioritization matrix for the scholarship. The preliminary prioritization matrix can include one or more entries associated with biographical, demographic, academic, and non-academic characteristics of applicants that indicate whether or not the applicant may be a good candidate for the scholarship and corresponding weighting factors indicating a relative amount of importance for the entries. Details regarding the generation of the prioritization matrix and corresponding weighting factors are discussed further herein.

During the period of time that the general application window is open, the application management engine 162 receives applications for the one or more scholarships submitted by the applicants 102. The applicants 102 can submit the applications by accessing a scholarship application UI screen output by the GUI engine 140 through a website, server portal, application interface, and the like. In some aspects, one or more of the data entry fields output to the scholarship application UI screen corresponds to the entries of the prioritization matrix. In addition, access to the scholarship application UI screen is controlled by the user management engine 130. In response to receiving a submitted application, the application management engine 162 validates the submitted data and outputting notifications to the applicants 102 to correct any information in the submitted application that does not conform to predefined criteria for data entry fields of the application and saves the information from the application data entry fields as application data 122. The application management engine 162 also automatically extracts one or more applicant attributes from the data entry fields of the submitted application and organizes the applicant attributes into an applicant attribute vector, which is also stored in the application data 122 of the data repository 114. In some implementations, the extracted applicant attributes that make up the applicant attribute vector correspond to the one or more entries of the generated prioritization matrix. For example, the applicant attribute vector can include entries associated with biographical, demographic, academic, and non-academic characteristics of the applicants 102.

The application management engine 162 also triggers the AQS calculation engine 135 to calculate an AQS for each of the applicants 102 based on the prioritization matrix by performing a vector overlap process. Details regarding the functionality of the AQS calculation engine 135 and the vector overlap process are discussed further herein. In response to receiving the calculated AQS for each of the applicants 102 from the AQS calculation engine 135, the application management engine 162 stores the calculated AQSs as AQS data 157 in the data repository 114 and automatically generates a scholarship prediction, which can be output to the applicants 102 via a UI screen in real time in response to submitting an application to the scholarship management system 108.

In some implementations, the application management engine 162 determines the scholarship prediction for a particular application by comparing the AQS of the applicant 102 to an average AQS for the scholarship that was awarded during a previous scholarship application cycle. For example, the application management engine 162 can assign a level of likelihood or probability that the applicant 102 will be awarded the scholarship by an amount the calculated AQS for the applicant 102 exceeds or falls short of the average AQS for the awarded scholarship during the previous application cycle. The levels of likelihood that the scholarship will be awarded to the applicant 102 may include high, medium, and low likelihoods. In some examples, the level of likelihood is represented by a confidence percentage. The application management engine 162 can also determine the level of likelihood that the scholarship will be awarded to a particular applicant based on how the calculated AQS for the applicant 102 compares to the AQSs of applicants that have already submitted applicants for the same scholarship cycle. In addition to outputting the scholarship prediction to the applicant 102 via a UI, the application management engine 162 also saves the scholarship prediction in the data repository 114 with the corresponding application data 122 for the applicant 102.

The application management engine 162 also determines whether a received application qualifies for expedited approval routing, which can also be referred to as prioritized routing. In some implementations, received applications for potential applicants identified by the potential applicant ID engine 133 who indicated that they were "very interested" or "maybe interested" in applying for the scholarship in response to receiving a scholarship interest inquiry may receive expedited or prioritized routing through a routing chain of the approvers 104. The application management engine 162 determines whether or not to flag the application for expedited routing by accessing the potential applicant data 152 to determine whether the applicant associated with the received application was identified as a potential applicant and if that potential applicant expressed an interest level of "very interested" or "maybe interested" in applying for the scholarship when replying to the scholarship interest inquiry. Once the application management engine 162 determines whether or not to flag the application for expedited routing, scholarship approval engine 131 is triggered to perform an application routing and approval process, as will be discussed in further detail herein.

The scholarship management system 108 also includes the prioritization matrix engine 138, which automatically generates a prioritization matrix in response to the opening of the application window for a scholarship. The entries of the prioritization matrix provide an indication of what the scholarship approvers 104 may consider to be important applicant attributes when deciding who to award scholarships to and are used to generate the AQS, which is a numerical representation of an amount of correlation between the applicant attribute vector and the prioritization matrix. The prioritization matrix can include one or more entries associated with biographical, demographic, academic, and non-academic characteristics of applicants that indicate whether or not the applicant may be a good candidate for the scholarship and corresponding weighting factors indicating a relative amount of importance for the entries. In some implementations, the prioritization matrix engine 138 also determines weighting factors for each of the entries of the prioritization matrix that provide an indication of a relative importance of each of the entries. For example, for an entry of total grade point average may have a higher weighting factor than entries that indicate age or gender of the applicant 102. As will be discussed further herein, the weighting factors for each entry of the prioritization matrix are used when calculating the AQS for each of the applicants 102 for the one or more scholarships.

In response to determining that the application window has opened, the prioritization matrix engine 138 determines whether or not the scholarship has been awarded in a previous application cycle. If the scholarship was awarded in a previous application cycle, then the prioritization matrix engine 138 accesses the prioritization matrix and corresponding weighting factors from the previous application cycle from prioritization matrix data 156 in the data repository 114, which is as a basis for generating the prioritization matrix for a current application cycle. If the scholarship was not awarded in the previous application cycle, then the prioritization matrix engine 138 generates a default prioritization matrix. In one example, the data repository stores default prioritization matrices for one or more scholarship categories as part of the prioritization matrix data 156. The scholarship categories can include degree level (e.g., graduate, undergraduate, etc.) or major associated with the scholarship. For example, the prioritization matrix data 156 can include a default prioritization matrix for graduate biomedical engineering scholarships. In some aspects, the weighting factors for the entries of the default prioritization matrix equal and set to a predetermined value, such as 0.5 in an example where the weighting factors are values between 0 and 1.

In addition, the prioritization matrix engine 138 triggers data mining/collection engine 136 to perform web crawling processes to access keyword data and other external source data 120 from one or more websites associated with government and economic priorities and scholarship priorities associated with the external entities 106 and other types of scholarship awarding institutions. For example, the data mining/collection engine 136 gathers information related to how a job market for a particular industry is performing by web crawling through job advertising websites, economic news websites, etc. and detecting a number of keyword "hits" associated with particular industries. The keyword data can include words or phrases such as "petroleum," "oil," "biomedical," "medicine," "law," and any other words associated with various industries or research areas. The keyword data along with any other extracted data can be stored in the data repository 114 as the external source data 120.

The prioritization matrix engine 138 uses the keyword data, other external source data 120, awarded scholarship data 156, and any other type of data to modify the data entries and weighting factors of the default prioritization matrix or the prioritization matrix that was used in a previous application cycle. For example, if the prioritization matrix engine 138 determines that a scholarship awarded during a previous scholarship application cycle favored a particular gender or hometown, then the prioritization matrix engine 138 may reduce the weighting factors associated with that particular gender or hometown and increase the weighting factors associated with other genders or hometowns in order to increase the diversity of students being awarded scholarships. Also, if a particular scholarship is awarded to a biomedical engineering student, and the extracted keyword data indicates that biomedical engineering that focuses on neurology is more popular than during the previous scholarship application cycle based on the number of keyword hits, then the prioritization matrix engine 138 may increase the weighting factor for an entry of the prioritization matrix associated with a research area focused on neurology. The weighting factors for each of the entries of the prioritization matrix can be determined or modified based on inputs received from the approvers 104 or other staff or administrators of the university or scholarship-awarding entities.

The scholarship management system 108 also includes an AQS calculation engine 135 that calculates the AQS, which is a numerical representation of an amount of correlation between the applicant attribute vector and the prioritization matrix and provides an indication of how well the applicants 102 meet certain criteria associated with awarding the scholarship. The AQS calculation engine 135 performs a vector overlap process, which computes the amount of correlation between the applicant attribute vector and the prioritization matrix for a particular scholarship. The output of the vector overlap process is sent to the application management engine 162, which generates the automatic scholarship prediction as previously discussed. If the vector overlap process is performed in conjunction with a potential applicant identification process, then the output of the vector overlap process is sent to the potential applicant ID engine 133. Details regarding the vector overlap process are discussed further herein. The AQSs calculated by the AQS calculation engine 135 are stored in the data repository 114 as the AQS data 157.

The scholarship management system 108 also includes a scholarship approval engine 131, which manages a flow of scholarship applications or scholarship modification requests through the one or more approvers 104 associated with the scholarships. The scholarship approval engine 131 determines an approval chain for a particular scholarship based on approver data 124 stored in the data repository 114. For example, an electrical engineering scholarship may be routed through an electrical engineering department chairman while a medical school scholarship may be routed through a medical school dean or chairman.

In response to determining that the application window has closed, the scholarship approval engine 131 automatically triggers the ranking engine 160 to rank the received applications for a particular scholarship according to the calculated AQS for each applicant. In response to receiving the ranked applicants from the ranking engine 160, the scholarship approval engine 131 routes the applications through the approval chain. If the application window has not closed, the scholarship approval engine 131 determines whether or not the received application has been flagged for expedited routing based on whether received application was identified as a potential applicant and if that potential applicant expressed an interest level of "very interested" or "maybe interested" in applying for the scholarship when replying to the scholarship interest inquiry. If the application was flagged for expedited routing, then the scholarship approval engine 131 automatically routes the application through the approval chain whether or not the application window has closed. If the application was not flagged for expedited routing, then the received application remains in a queue until the application window closes.

The scholarship approval engine 131 controls the flow of applications through the approvers 104 based on the approval chain for a particular scholarship or scholarship modification request. For example, the approvers 104 for a particular scholarship for an internal applicant includes one or more of a department chairman, a college dean, a scholarship committee chairman, or a university chairman. For an external applicant, the approval chain may also include a dean of higher education and a member of ministry of education in addition to the approvers 104 for the internal applicants.

In some implementations, the scholarship approval engine 131 triggers the GUI engine 140 to output an approver interface screen to each of the approvers 104 as the applications for the scholarship are routed through the approval chain. The approver interface screen is a dashboard that provides the approvers 104 with various types of data that can include scholarship statistics from previous application cycles, a quick-view list of the applicants 102 for the scholarship with the corresponding AQS, scholarship award statistics for the current application cycle, etc. The approver user interface screen provides the approvers the ability to approve or deny a scholarship award to a particular applicant, input an award amount, and input additional information related to why the approver awarded or did not award the scholarship to the particular applicant. The approver user interface screen can also include the decisions by the previous reviewers in the approval chain so that a final approver can select applicants for scholarship awards based on inputs received from the other approvers 104 in the approval chain. In some implementations, the scholarship award decision made by the final approver in the approval chain is a final award decision.

Once the applications have been routed through the approval chain and the award decision has been determined, the scholarship approval engine 131 triggers awarded scholarship management engine 134 to output awarded scholarship information to the applicants 102 who have been awarded scholarships. The awarded scholarship information can be output to the applicants with digital signatures or stamps that indicate the award amount. In addition, in response to receiving the final award decision, the scholarship approval engine 131 triggers a budget management engine 144 to modify a total scholarship budget based on the total amount of money awarded for the scholarship.

The scholarship management system 108 also includes the budget management engine 144 that manages a total amount of money budgeted toward the scholarships awarded by the scholarship management system 108. In some implementations, based on an amount of money awarded in scholarships by the scholarship management system 108 for a scholarship application window, the budget management engine 144 may determine that an additional scholarship application window can be opened and can allocate any remaining money in a scholarship budget to one or more scholarships that can be awarded during the additional scholarship window. The budget management engine 144 accesses historical and current budget data 118 stored in the data repository 114 and updates the budget data 118 based on the awarded scholarships.

The scholarship management system 108 also includes an awarded scholarship management engine 134 that controls the award of scholarship to the applicants. In response to receiving the award decision from the scholarship approval engine 131, the awarded scholarship management engine 134 outputs awarded scholarship information to the applicants 102 as well as stores the awarded scholarship information as awarded scholarship data 154 in the data repository 114, which can be used in future scholarship application cycles to generate the prioritization matrix, allocate funds, identify potential applications, etc. The awarded scholarship management engine 134 can also interface with financial institutions of the applicants 102 and the university to transfer scholarship funds from the university to the applicants 102 who are awarded the scholarships.

In addition to outputting awarded scholarship information to the applicants 102 who are awarded scholarships, the awarded scholarship management engine 134 also manages scholarship modifications in response to receiving a scholarship modification request from an applicant 102. In some implementations, scholarships have benefits to the applicants 102 other than receiving an education. For example, the awarded scholarships may also allow for applicants who are awarded scholarships, also referred to as awarded applicants, to attend conferences, go on education tours, etc. The awarded applicants can submit a modification request to allocate scholarship funds to attend the conferences or go on the education tours. The awarded applicants can also submit modification requests to extend the scholarship, increase the scholarship award amount, transfer the scholarship to another institution, or terminate the scholarship. In some implementations, the awarded scholarship management engine 134 receive the scholarship modification request from the GUI engine 140 that receives a modification request at a scholarship modification interface screen where the awarded applicants can input a type of modification request as well as a reason for submitting the modification request.

In response to receiving the scholarship modification request, the awarded scholarship management engine 134 determines whether the request is within predetermined scholarship terms that provide for automatic approval of the request. For example, if the modification request is a request to attend a conference and the awarded scholarship data 154 for the scholarship indicates that the awarded applicant is allowed to attend one conference under the terms of the scholarship. If the modification request is within the scholarship terms, then the awarded scholarship management engine 134 outputs an approval to the awarded applicant who is making the request and updates the awarded scholarship data 154 in the data repository 114 to indicate that the approval was granted. If the modification request is not within the predetermined scholarship terms, then the awarded scholarship management engine 134 triggers the scholarship approval engine 131 to route the scholarship modification request through the approval chain to process the scholarship modification request. For example, the approval chain for the scholarship modification request is based on the type of modification request being submitted and can include one or more of the department chairman, college dean, scholarship committee chairman, or university chairman. Once the awarded scholarship management engine 134 receives a final modification decision from the scholarship approval engine 131, the final modification decision is output to the awarded applicant who initiated the request, and the awarded scholarship data 154 stored in the data repository 114 is updated.

The scholarship management system 108 also includes a ranking engine 160 that automatically ranks the applicants 102 in real-time according to one or more metrics or categories in response to a ranking request from one of the other processing engines. For example, the potential applicant ID engine 133 triggers the ranking engine 160 to rank the potential applicants from highest to lowest preliminary AQS in order to identify a predetermined number of highest-ranked potential applicants. In addition, when an application window closes, the scholarship approval engine 131 triggers the ranking engine 160 to rank the applicants 102 from highest to lowest AQS. In other implementations, the ranking engine 160 can also rank the applicants 102 according to other metrics such as class rank, GPA, etc.

The scholarship management system 108, in some implementations, also includes a graphical user interface (GUI) engine 140 that controls dissemination and reception of data from the applicants 102, approvers 104, and external entities 106 through one or more user interface (UI) screens that are output to the external devices 158. For example, potential applicants can indicate a level of interest in applying for a particular scholarship at a scholarship interest inquiry UI screen. The GUI engine 140 can also output a scholarship application UI screen to the applicants 102 who are applying for the scholarships managed by the scholarship management system 108. In addition, the GUI engine 140 can output a scholarship approver UI screen which is a dashboard that provides the approvers 104 with various types of data that can include scholarship statistics from previous application cycles, a quick-view list of the applicants 102 for the scholarship with the corresponding AQS, scholarship award statistics for the current application cycle, etc. Applicants who have been awarded scholarships can submit scholarship modification requests via a scholarship modification UI screen, which is controlled by the GUI engine 140.

The scholarship management system 108, in some implementations, also includes a real-time notification engine 148 that ensures that data input to scholarship management system 108 is processed in real-time. In addition, the processes executed by the real-time notification engine 148 ensure interactions between the participants and the scholarship management system 108 are processed in real-time. For example, the real-time notification engine 104 outputs alerts and notifications to the approvers 104, applicants 102, external entities 106 via the UI screens when an application window has open or closed, when a potential applicant has submitted an application, when a scholarship modification request has been received, etc.

In some implementations, data associated with the processes performed by the scholarship management system 108 is stored in one or more data repositories of the scholarship management environment 100 such as the data repository 114. Data received by the scholarship management system 108 from the one or more data sources can be received and stored in real-time with respect to when the data is received from the data sources. In addition, the data can be stored automatically in response to receiving one or more data files from the data sources. The data stored in the data repository can be auto load data that is updated automatically from one or more sources at predetermined time intervals. For example, auto load data can include the current student data 128 that is automatically updated from institution registrar databases or external source data 120 that is received from the external entities 106 or gathered via web crawling processes.

The data stored in the data repository 114 can also include manually entered information that is input via UIs at the external devices 158 and is received by the data mining/ collection engine 136 of the scholarship management system 108. The manually entered information can then be then processed by the data management engine 142 before being disseminated to other processing engines of the scholarship management system 108. The manually entered data can include the application data 122 extracted from the submitted applications, approver data 124 that indicates the approval chain for the scholarships, and budget data 118 that indicates the budget allocated for the various scholarships.

The data repository 114 can also store process execution data that is generated by the scholarship management system 108 when executing the processes associated with identifying potential applicants, processing and awarding scholarship applications, and processing scholarship modification requests. For example, the process execution data can include the potential applicant data 152 that includes an amount of interest a potential applicant has in applying for a particular scholarship based on a response to a scholarship interest inquiry. The process execution data can also include awarded scholarship data 154, prioritization matrix data 156, and AQS data 157.

Figure 2:
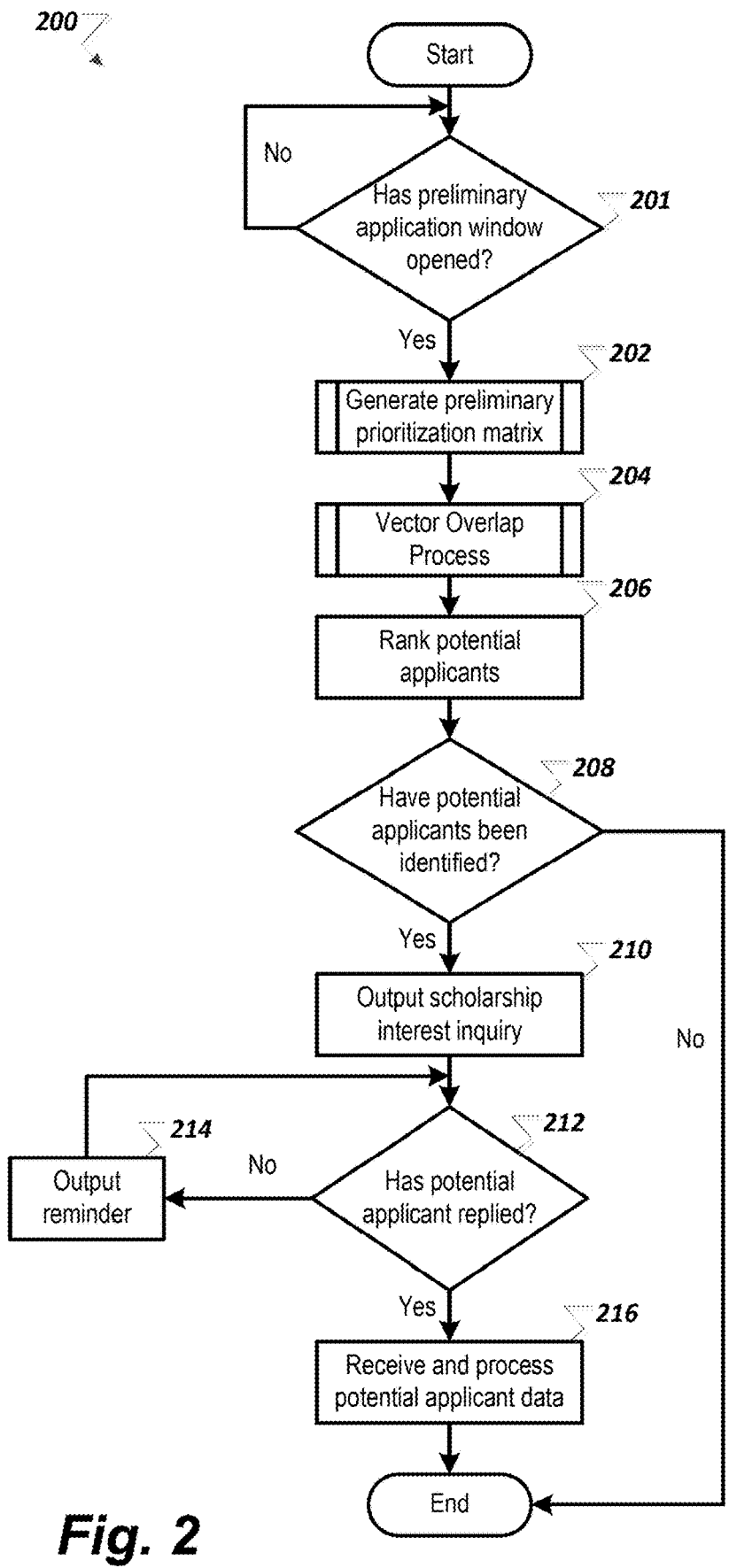
FIG. 2 is a flowchart of a potential applicant identification process.

FIG. 2 is an exemplary flowchart of a potential applicant identification process 200, which is controlled by the potential applicant ID engine 133. For example, the potential applicant ID engine 133 automatically triggers other processing engines of the scholarship management system 108 in real-time to perform one or more steps of the potential applicant identification process 200 and processes the data received from the other processing engines in accordance with the steps of the process 200.

At step 201, the potential applicant ID engine 133 determines whether a preliminary application window has opened, which corresponds to a predefined period of time before a general application window opens when applications are accepted by the scholarship management system 108. The preliminary application window may be several days, a week, a month, several months, etc. before the general application window opens. If the preliminary application window has opened, resulting in a "yes" at step 201, then step 202 is performed. Otherwise, if the preliminary application window has not opened, resulting in a "no" at step 201, then the process 200 returns to step 201.

At step 202, the potential applicant ID engine 133 triggers the prioritization matrix engine 138 to generate a preliminary prioritization matrix for the scholarship. In some implementations, the preliminary prioritization matrix is an abbreviated version of the prioritization matrix that is used to calculate the AQS for purposes of determining which of the applicants 102 to award scholarships to. For example the preliminary prioritization matrix can include one or more entries associated with biographical, demographic, academic, and non-academic characteristics of applicants that indicate whether or not the applicant may be a good candidate for the scholarship and corresponding weighting factors indicating a relative amount of importance for the entries. Details regarding steps of a process for generating the preliminary prioritization matrix are discussed further herein.

At step 204, the potential applicant ID engine 133 also trigger the AQS calculation engine 135 to calculate a preliminary AQS for each of the students represented by the current student data 128 stored in the data repository 114 based on the preliminary prioritization matrix by performing a vector overlap process. The potential applicant ID engine 133 configures the current student data 128 stored in the data repository 114 into a preliminary applicant attribute vector. The preliminary AQS indicates an amount of correlation between the preliminary applicant attribute vector and preliminary prioritization matrix. The AQS calculation engine 135 returns the calculated preliminary AQSs for the students represented by the current student data 128 to the potential applicant ID engine 133. Details regarding the vector overlap process are discussed further herein.

At step 206, in response to receiving the calculated preliminary AQSs from the AQS calculation engine 135, the potential applicant ID engine 133 triggers ranking engine 160 to rank the potential applicants from highest to lowest preliminary AQS. In some implementations, the ranking as well as a calculated preliminary AQS value are used to identify the students that are most qualified for one or more of the scholarships offered by the scholarship management system 108.

At step 208, the potential applicant ID engine 133 determines whether or not any potential applicants have been identified based on the calculated preliminary AQSs for the students represented by the current student data 128 as well as the preliminary AQS rankings. In one example, if a total number or total percentage of the students has a preliminary AQS that is greater than a preliminary AQS threshold, then the potential applicant ID engine 133 determines that the potential applicants are the students with AQSs that fall within a top predetermined number of AQSs. For example, if 75% of the preliminary AQSs for a particular scholarship out of a total of 100 students are greater than a predetermined threshold, then the potential applicant ID engine 133 determines that the potential applicants are the top ten ranked students with AQSs that are greater than the preliminary AQS threshold. The potential applicant ID engine 133 also stores the preliminary AQS calculations and corresponding rankings in the data repository 114 as potential applicant data 152. If one or more potential applicants are identified, resulting in a "yes" at step 208, then step 210 is performed. Otherwise, if no potential applicants are identified, resulting in a "no" at step 208, then the process 200 is terminated.

At step 210, in response to determining the potential applicants, the potential applicant ID engine 133 automatically triggers the GUI engine 140 to output scholarship interest inquiries to the applicants 102 that are identified as the potential applicants. The scholarship interest inquiry can be output to the applicants 102 via any type of messaging medium, such as email, text message, notification on webpage or electronic device application, etc. In some implementations, the scholarship interest inquiry is output to the potential applicants to gauge a level of interest a particular potential applicant has in applying for the scholarship. For example, the potential applicant can reply to the scholarship interest inquiry by indicating via one or more input fields on the scholarship interest inquiry message or webpage that he or she is "very interested," "maybe interested," or "not interested."

At step 212, the potential applicant ID engine 133 determines whether or not the potential applicant has replied to the scholarship interest inquiry. If the potential applicant has replied to the scholarship interest inquiry, resulting in a "yes" at step 212, then step 216 is performed. Otherwise, if the potential applicant has not replied to the scholarship interest inquiry, resulting in a "no" at step 212, then step 214 is performed.

At step 214, in response to determining that the potential applicant has not replied to the scholarship interest inquiry, the potential applicant ID engine 133 outputs reminders at predetermined time intervals until the general application window opens when applications are accepted by the scholarship management system 108. For example, the potential applicant ID engine 133 can output scholarship interest inquiry reminders to the potential applicants who have not replied on a weekly basis until the general application window opens.

At step 216, the reply to the scholarship interest inquiry is received and processed, which includes being saved as part of the potential applicant data 152 in the data repository 114 with the corresponding potential applicant's ranking and preliminary AQS. In some implementations, if a potential applicant who has indicated that he or she is "very interested" or "maybe interested" submits an application for the scholarship, that potential applicant's application is flagged for expedited processing and approval.

Figure 3:
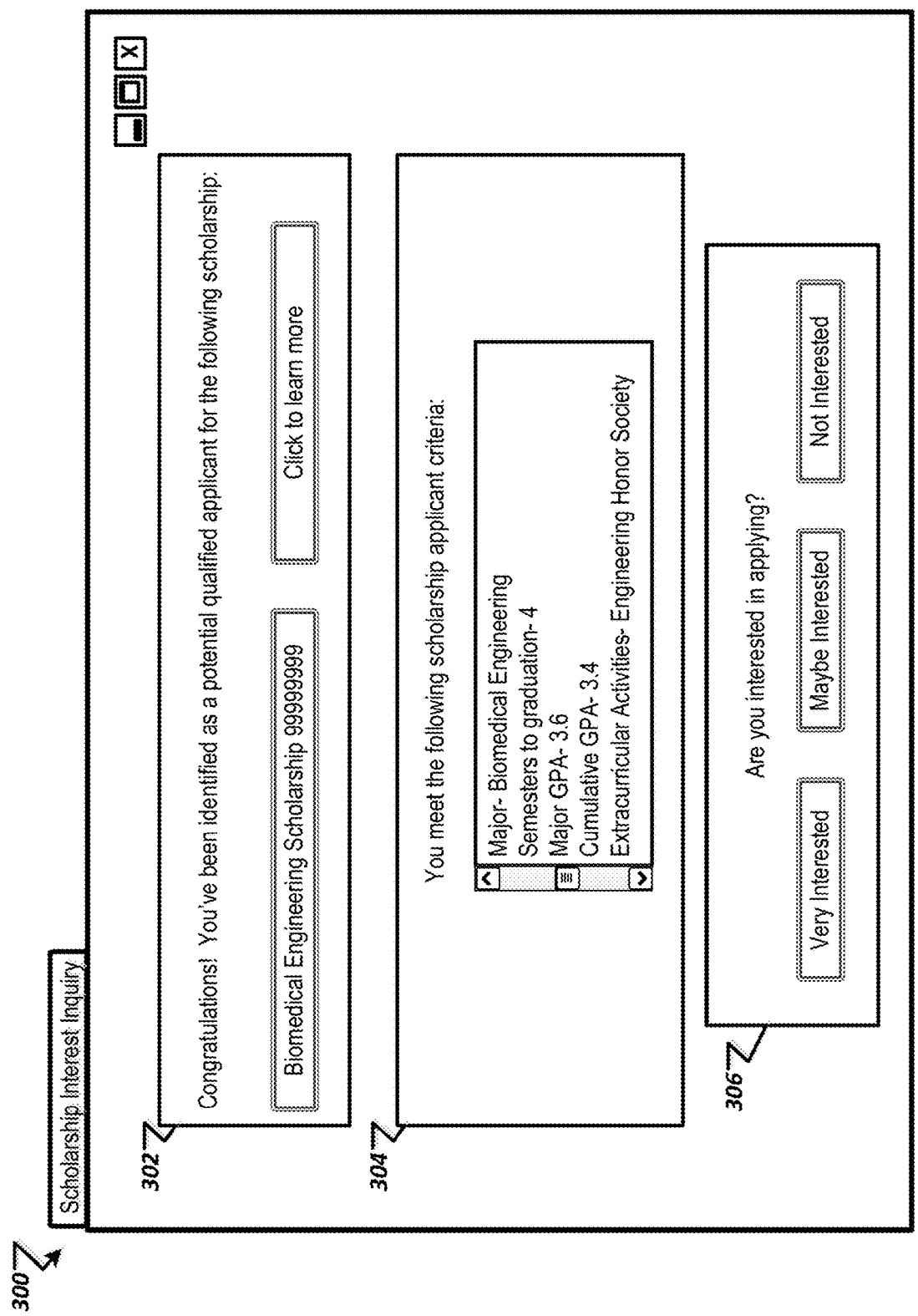
FIG. 3 illustrates a screenshot of a scholarship interest inquiry user interface screen.

FIG. 3 is an exemplary screenshot of a scholarship interest inquiry user interface (UI) 300. The scholarship interest inquiry UI 300 may be output by the GUI engine 140 to the potential applicants in one or more formats, such as email, text message, notification on webpage or electronic device application, etc. The scholarship interest inquiry UI 300 includes multiple data fields and input fields that allow the potential applicants to view information related to the scholarship they have been identified as potential applicants for as well as indicate a level of interest in applying for the scholarship. For example, the GUI engine 140 outputs a scholarship title to data field 302 that indicates to the potential applicant which scholarship the potential applicant ID engine 133 has determined that the potential applicant is a good candidate for. The data field 302 also includes an input that the potential applicant can select to view additional details regarding the scholarship, such as monetary award, scholarship term, research opportunities associated with the scholarship, and other details related to the scholarship. In data field 304, the GUI engine 140 outputs one or more attributes of the current student data 128 for the potential applicant that had a highest amount of contribution to the calculated preliminary AQS. At data field 306, the GUI engine 140 receives a selection from the potential applicant that indicates whether or not the potential applicant is interested in applying for the scholarship. For example, the data field 306 includes "very interested," "maybe interested," and "not interested" selections. The GUI engine 140 passes the received selection to the potential applicant ID engine 133, and the received selection is saved as part of the potential applicant data 152 in the data repository 114 with the corresponding potential applicant's ranking and preliminary AQS.

Figure 4:
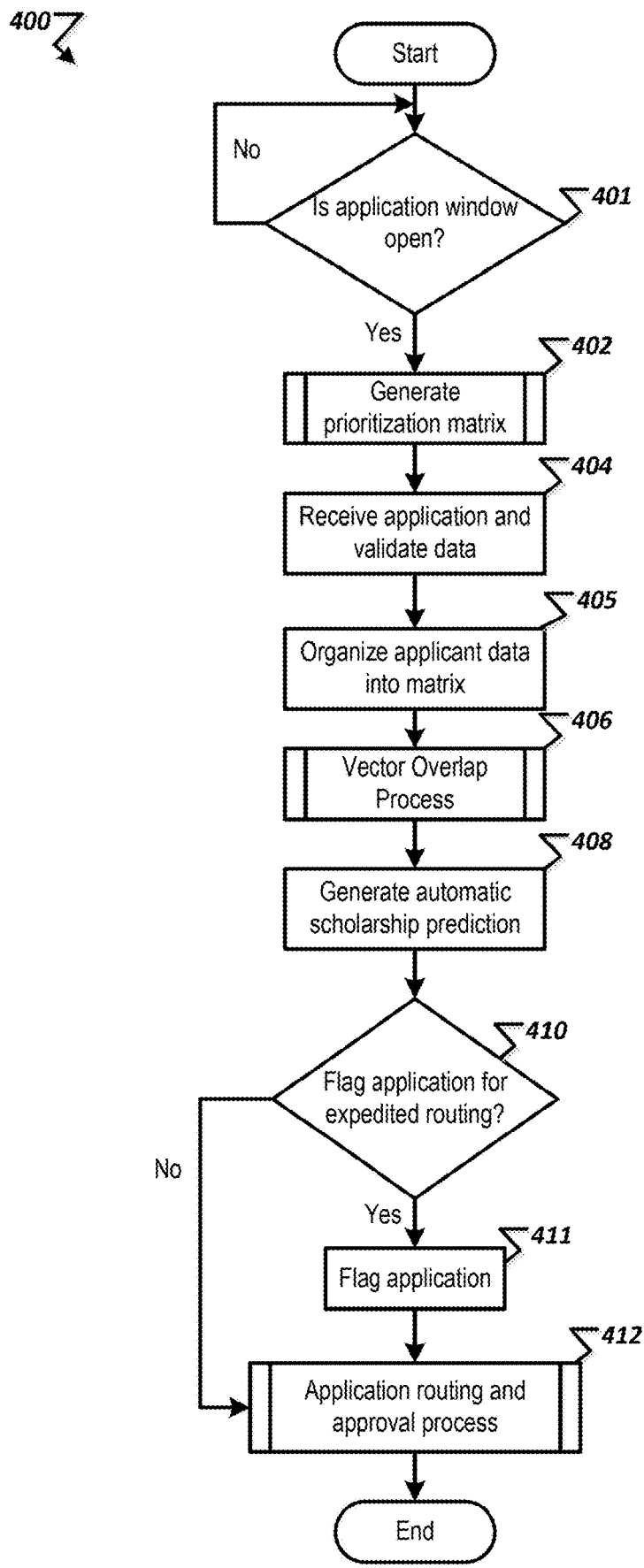
FIG. 4 is a flowchart of an application management process.

FIG. 4 is an exemplary flowchart of an application management process 400, which is controlled by the application management engine 162. For example, the application management engine 162 automatically triggers other processing engines of the scholarship management system 108 in real-time to perform one or more steps of the application management process 400 and processes the data received from the other processing engines in accordance with the steps of the process 400.

At step 401, the scholarship management engine 162 determines whether the general application window has opened, which corresponds to a predetermined number of days, weeks, or months when applications are received by the scholarship management system 108. For example, the general application window may occur between November 2016 and February 2017 for a scholarship commencement date of August 2017. If the general application window has opened, resulting in a "yes" at step 401, then step 402 is performed. Otherwise, if the general application window has not opened, resulting in a "no" at step 401, then the process 400 returns to step 401.

At step 402, if the general application window has opened, the application management engine 162 triggers prioritization matrix engine 138 to generate a prioritization matrix for the scholarship. The preliminary prioritization matrix can include one or more entries associated with biographical, demographic, academic, and non-academic characteristics of applicants that indicate whether or not the applicant may be a good candidate for the scholarship and corresponding weighting factors indicating a relative amount of importance for the entries. Details regarding steps of a process for generating the prioritization matrix and corresponding weighting factors are discussed further herein.

At step 404, during the period of time that the general application window is open, the application management engine 162 receives applications for the one or more scholarships submitted by the applicants 102. The applicants 102 can submit the applications by accessing a scholarship application UI screen output by the GUI engine 140 through a website, server portal, application interface, and the like. In some aspects, one or more of the data entry fields output to the scholarship application UI screen corresponds to the entries of the prioritization matrix. In addition, access to the scholarship application UI screen is controlled by the user management engine 130. In response to receiving a submitted application, the application management engine 162 validates the submitted data and outputting notifications to the applicants 102 to correct any information in the submitted application that does not conform to predefined criteria for data entry fields of the application.

At step 405, the application management engine 162 automatically extracts one or more applicant attributes from the data entry fields of the submitted application and organizes the applicant attributes into an applicant attribute vector. In some implementations, the extracted applicant attributes that make up the applicant attribute vector correspond to the one or more entries of the generated prioritization matrix. For example, the applicant attribute vector can include entries associated with biographical, demographic, academic, and non-academic characteristics of the applicants 102. Details regarding the applicant attribute vector are discussed further herein.

At step 406, the application management engine 162 triggers the AQS calculation engine 135 to calculate an AQS for each of the applicants 102 based on the prioritization matrix by performing a vector overlap process. Details regarding the functionality of the AQS calculation engine 135 and the vector overlap process are discussed further herein. In response to receiving the calculated AQS for each of the applicants 102 from the AQS calculation engine 135, the application management engine 162 stores the calculated AQSs as AQS data 157 in the data repository 114.

At step 408, the application management engine 162 automatically generates a scholarship prediction, which can be output to the applicants 102 via a UI screen in real time in response to submitting an application to the scholarship management system 108. In some implementations, the application management engine 162 determines the scholarship prediction for a particular application by comparing the AQS of the applicant 102 to an average AQS for the scholarship that was awarded during a previous scholarship application cycle. For example, the application management engine 162 can assign a level of likelihood that the applicant 102 will be awarded the scholarship by an amount the calculated AQS for the applicant 102 exceeds or falls short of the average AQS for the awarded scholarship during the previous application cycle. The levels of likelihood that the scholarship will be awarded to the applicant 102 may include high, medium, and low likelihoods. In some examples, the level of likelihood is represented by a confidence percentage. The application management engine 162 can also determine the level of likelihood that the scholarship will be awarded to a particular applicant based on how the calculated AQS for the applicant 102 compares to the AQSs of applicants that have already submitted applicants for the same scholarship cycle. In addition to outputting the scholarship prediction to the applicant 102 via a UI, the application management engine 162 also saves the scholarship prediction in the data repository 114 with the corresponding application data 122 for the applicant 102.

At step 410, the application management engine 162 also determines whether a received application qualifies for expedited approval routing. In some implementations, received applications for potential applicants identified by the potential applicant ID engine 133 who indicated that they were "very interested" or "maybe interested" in applying for the scholarship in response to receiving a scholarship interest inquiry may receive prioritized routing through a routing chain of the approvers 104. The application management engine 162 determines whether or not to flag the application for expedited routing by accessing the potential applicant data 152 to determine whether the applicant associated with the received application was identified as a potential applicant and if that potential applicant expressed an interest level of "very interested" or "maybe interested" in applying for the scholarship when replying to the scholarship interest inquiry.

If the application management engine 162 determines that the received application qualifies for expedited routing, resulting in "yes" at step 410, then step 411 is performed where the application data 122 associated with the expedited application is flagged for expedited routing, and then step 412 is performed. If the application management engine 162 determines that the received application does not qualify for expedited routing, resulting in a "no" at step 410, then the process 400 proceeds to step 412.

At step 412, once the application management engine 162 determines whether or not to flag the application for expedited routing, scholarship approval engine 131 is triggered to perform an application routing and approval process, as will be discussed in further detail herein.

FIG. 5 is an exemplary screenshot of a scholarship application UI screen 500. The scholarship application UI 500 may be output by the GUI engine 140 to the applicants 102 accessing the scholarship application UI screen 500 via a webpage, server portal, etc. The scholarship application UI screen 500 includes multiple data fields and input fields that allow the applicants 102 to view information related to the scholarship they are applying for as well as input the application data 122 that is extracted from the electronically-submitted scholarship application by the scholarship management engine 162 in response to a selection of submission button 512. For example, the GUI engine 140 outputs a scholarship title to data field 502 that indicates which scholarship the applicant 102 is applying for. At data input field 504, the GUI engine 140 receives biographical information inputs from the applicant 102 that can include name, gender, birth date, applicant/student identification number, ethnicity, affiliated university or institution, etc. At data input field 506, the GUI engine 140 receives academic information inputs from the applicant 102 that can include semesters until graduation, major, major grade point average (GPA), research focus, class rank within major, overall class rank, etc. At data input field 508, the GUI engine 140 receives other information inputs from the applicant 102 that can include community service, extracurricular activities, a personal statement or essay, etc. The scholarship application UI screen 500 can also include other types of input data fields than those described herein. In addition, the scholarship application UI screen 500 includes attachment selection 510 that when selected, provides the applicant with another UI screen where the applicant 102 can attach any additional documentation such as transcripts, recommendation letters, etc. The GUI engine 140 passes the received inputs to the application management engine 162, which are configured into the applicant attribute vector along with any other information not included in the applicant attribute vector, which is saved as the applicant data 122 in the data repository 114.

Figure 6:
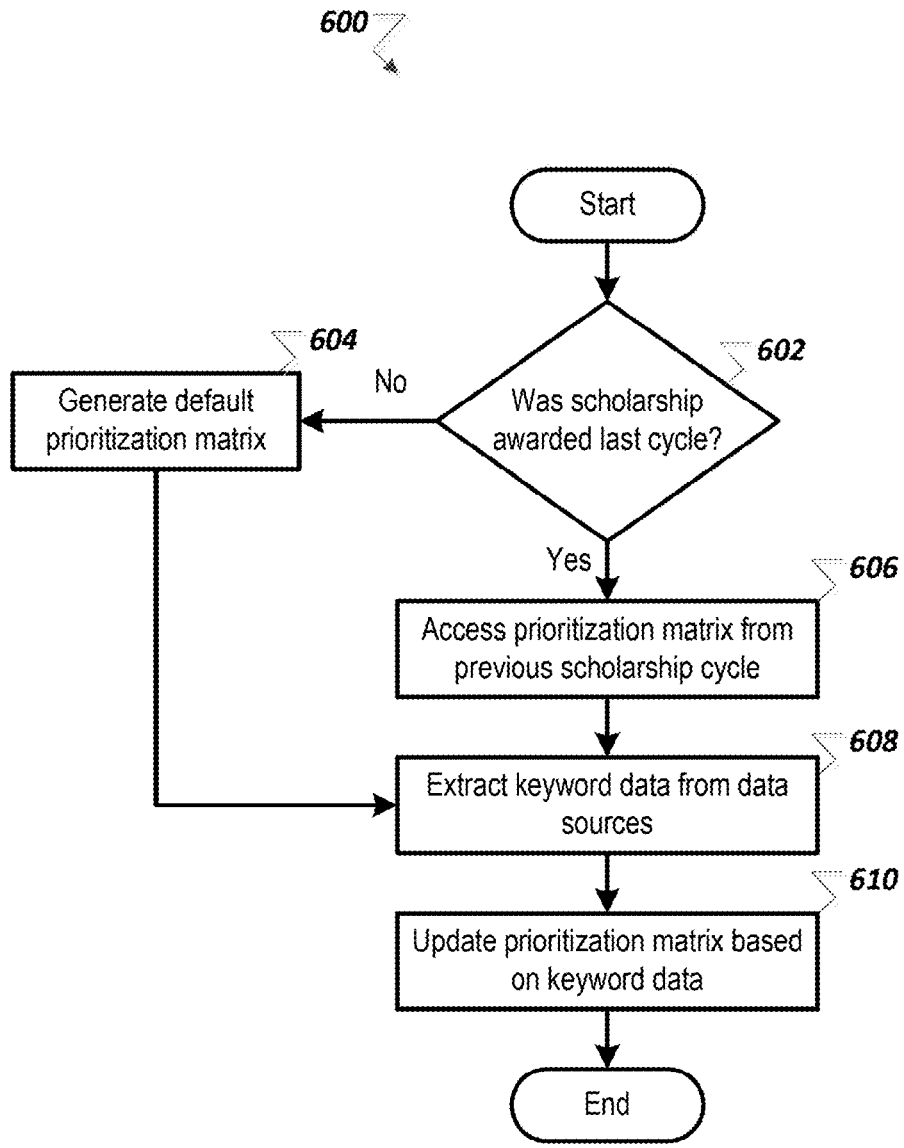
FIG. 6 is a flowchart of a prioritization matrix generation process.

FIG. 6 is an exemplary flowchart of a prioritization matrix generation process 600, which is controlled by the prioritization matrix engine 162. For example, the application management engine 162 automatically triggers other processing engines of the scholarship management system 108 in real-time to perform one or more steps of the prioritization matrix generation process 600 and processes the data received from the other processing engines in accordance with the steps of the process 600. The prioritization matrix engine 138 automatically generates a prioritization matrix in response to the opening of the application window for a scholarship. The entries of the prioritization matrix provide an indication of what the scholarship approvers 104 may consider to be important applicant attributes when deciding who to award scholarships to and are used to generate the AQS, which is a numerical representation of an amount of correlation between the applicant attribute vector and the prioritization matrix.

At step 602, in response to determining that the application window has opened, the prioritization matrix engine 138 determines whether or not the scholarship has been awarded in a previous application cycle. If the scholarship was awarded in a previous application cycle, resulting in a "yes" at step 602, then step 606 is performed. Otherwise, if it is determined that the scholarship was not awarded in a previous application cycle, resulting in a "no" at step 602, then step 604 is performed.

At step 606, if the scholarship was awarded in a previous application cycle, then the prioritization matrix engine 138 accesses the prioritization matrix and corresponding weighting factors from the previous application cycle from prioritization matrix data 156 in the data repository 114, which is as a basis for generating the prioritization matrix for a current application cycle.

At step 604, if the scholarship was not awarded in the previous application cycle, then the prioritization matrix engine 138 generates a default prioritization matrix. In one example, the data repository stores default prioritization matrices for one or more scholarship categories as part of the prioritization matrix data 156. The scholarship categories can include degree level (e.g., graduate, undergraduate, etc.) or major associated with the scholarship. For example, the prioritization matrix data 156 can include a default prioritization matrix for graduate biomedical engineering scholarships. In some aspects, the weighting factors for the entries of the default prioritization matrix equal and set to a predetermined value, such as 0.5 in an example where the weighting factors are values between 0 and 1.

At step 608, the prioritization matrix engine 138 triggers data mining/collection engine 136 to perform web crawling processes to access keyword data and other external source data 120 from one or more websites associated with government and economic priorities and scholarship priorities associated with the external entities 106 and other types of scholarship awarding institutions. For example, the data mining/collection engine 136 gathers information related to how a job market for a particular industry is performing by web crawling through job advertising websites, economic news websites, etc. and detecting a number of keyword "hits" associated with particular industries. The keyword data can include words or phrases such as "petroleum," "oil," "biomedical," "medicine," "law," and any other words associated with various industries or research areas. The keyword data along with any other extracted data can be stored in the data repository 114 as the external source data 120.

At step 610, the prioritization matrix engine 138 uses the keyword data, other external source data 120, awarded scholarship data 156, and any other type of data to update or modify the data entries and weighting factors of the default prioritization matrix or the prioritization matrix that was used in a previous application cycle. For example, if the prioritization matrix engine 138 determines that a scholarship awarded during a previous scholarship application cycle favored a particular gender or hometown, then the prioritization matrix engine 138 may reduce the weighting factors associated with that particular gender or hometown and increase the weighting factors associated with other genders or hometowns in order to increase the diversity of students being awarded scholarships. Also, if a particular scholarship is awarded to a biomedical engineering student, and the extracted keyword data indicates that biomedical engineering that focuses on neurology is more popular than during the previous scholarship application cycle based on the number of keyword hits, then the prioritization matrix engine 138 may increase the weighting factor for an entry of the prioritization matrix associated with a research area focused on neurology. The weighting factors for each of the entries of the prioritization matrix can be determined or modified based on inputs received from the approvers 104 or other staff or administrators of the university or scholarship-awarding entities.

Figure 7:
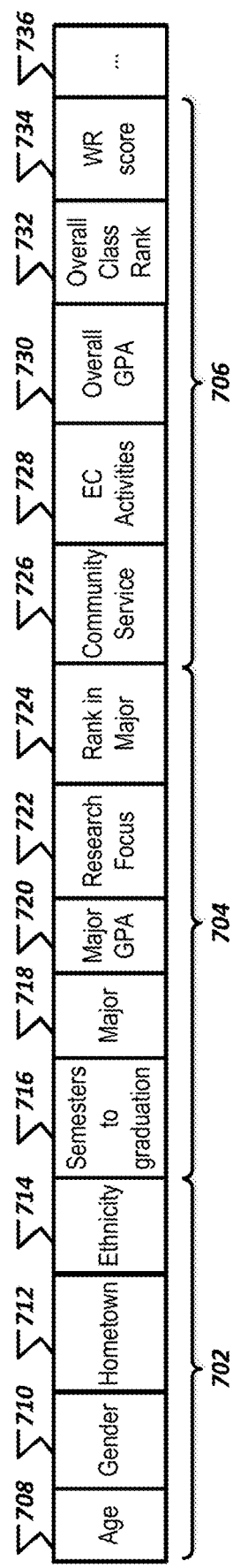
FIG. 7 is an exemplary diagram of a data structure of an applicant attribute vector.
Figure 8:
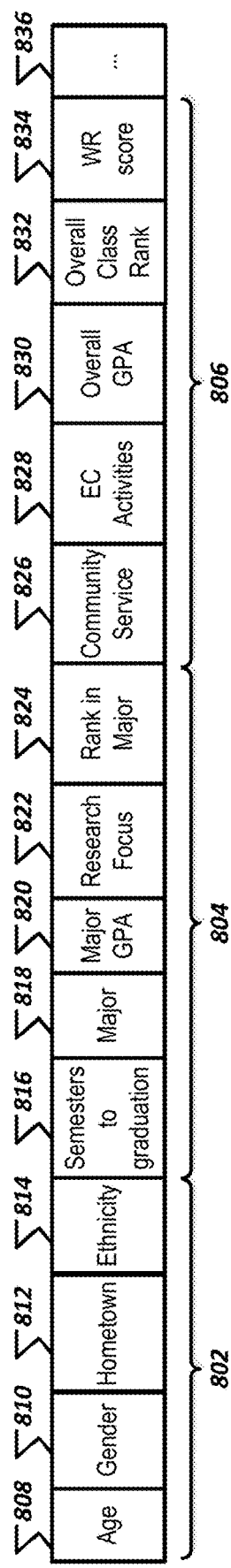
FIG. 8 is an exemplary diagram of a data structure of a prioritization matrix.

FIG. 7 is a data structure of an applicant attribute vector made that includes the current student data 128 that is used to characterize a particular potential applicant in the potential applicant identification process 200 or an applicant 102 in the application management process 400. Each of the different components, which will soon be discussed, is used to characterize the constituent components. The applicant attributes may vary depending on the entries of the prioritization matrix for the associated scholarship being applied for. Moreover, the constituent components of the applicant attribute vector are shown in FIG. 7, and one example of the components of the corresponding prioritization matrix is shown in FIG. 8.

With regard to FIG. 7, each of the components will now be discussed with respect to typical attributes that can be part of the applicant attribute vector. Attribute 708, A1, relates to an age of an applicant. The values for attribute A1 range between 0 and 1, and an example breakdown of how the values are mapped is shown in TABLE 1. While the values are shown to range between 0 and 1, this has been done as a matter of convenience to normalize the impact of each attribute. Other ranges of values may be used as well, perhaps even without each attribute having a same range so that some attributes may be weighted more heavily than others.

TABLE 1

| APPLICANT ATTRIBUTE | Age | VALUE Range 0 to 1 |
|---|---|---|
| A1, 708 | <18 | .2 |
|  | 18-22 | .4 |
|  | 23-28 | .6 |
|  | 28-35 | .8 |
|  | >35 | 1 |

Attribute 710, A2, includes gender of the applicant. Example values for A2 are shown in TABLE 2 below.

TABLE 2

| APPLICANT ATTRIBUTE | Gender | VALUE Range 0 to 1 |
|---|---|---|
| A2, 710 | Male | 0 |
|  | Female | 0.5 |
|  | Other | 1 |

Attribute 712, A3, includes a hometown the applicant, which can be indicated as a particular country or region of a country. Example values for A3 are shown in TABLE 3 below.

TABLE 3

| APPLICANT ATTRIBUTE | Hometown/Region | VALUE Range 0 to 1 |
|---|---|---|
| A3, 712 | Northern Region | 0 |
|  | Southern Region | 0.25 |
|  | Eastern Region | 0.75 |
|  | Western Region | 1 |

Attribute 714, A4, includes an ethnicity of an applicant. Example values for A4 are shown in TABLE 4 below.

TABLE 4

| APPLICANT ATTRIBUTE | Ethnicity | VALUE Range 0 to 1 |
|---|---|---|
| A4, 714 | African | 0 |
|  | Caucasian/European | .25 |
|  | Hispanic or Latino | .50 |
|  | Asian | .75 |
|  | Arab/Middle Eastern | 1 |

Attributes 702, 710, 712, and 714 are biographical components of the applicant attribute matrix that provide basic biographical information about the applicant. These components of the applicant attribute vector are referred to as biographical components 702.

Attribute 716, A5, includes a number of semesters until graduation of the applicant. Example values for A5 are shown in TABLE 5 below.

TABLE 5

| APPLICANT ATTRIBUTE | # of Semesters to Graduation | VALUE Range 0 to 1 |
|---|---|---|
| A5, 716 | >4 | 0 |
|  | 3-4 | .25 |
|  | 2 | .50 |
|  | 1 | .75 |
|  | 0 | 1 |

Attribute 718, A6, includes a major focus of study of the applicant 102. The major can include a category of majors or specific majors. Examples for A6 are shown in TABLE 7 below.

TABLE 6

| APPLICANT ATTRIBUTE | Major | VALUE Range 0 to 1 |
|---|---|---|
| A6, 718 | Arts/Humanities | 0 |
|  | Sciences | .35 |
|  | Biomedical Engineering | .55 |

TABLE 6-continued

| APPLICANT ATTRIBUTE | Major | VALUE Range 0 to 1 |
|---|---|---|
|  | Electrical Engineering | .75 |
|  | Other Engineering | 1 |

Attribute 720, A7, includes a grade point average (GPA) of the applicant 102 within the applicant's major focus of study. Examples for A7 are shown in TABLE 7 below.

TABLE 7

| APPLICANT ATTRIBUTE | Major GPA (4.0 Scale) | VALUE Range 0 to 1 |
|---|---|---|
| A7, 720 | <2.0 | 0 |
|  | 2.0-2.49 | .35 |
|  | 2.5-2.99 | .55 |
|  | 3.0-3.50 | .75 |
|  | >3.50 | 1 |

Attribute 722, A8, includes a research focus of the applicant 102 within the applicant's major focus of study. Examples for A8 within a biomedical engineering major are shown in TABLE 8 below.

TABLE 8

| APPLICANT ATTRIBUTE | Research Focus | VALUE Range 0 to 1 |
|---|---|---|
| A8, 722 | Biomaterials and Drug Delivery | 0 |
|  | Biomedical Mechanics | .35 |
|  | Imaging and Instrumentation | .55 |
|  | Micro- and Nano-biotechnology | .75 |
|  | Molecular, Cellular, and Tissue Engineering | 1 |

Attribute 724, A9, includes a class rank of the applicant 102 within the applicant's major focus of study which can be indicated as a percentage from a highest rank. Examples for A9 are shown in TABLE 9 below.

TABLE 9

| APPLICANT ATTRIBUTE | Class Rank in Major | VALUE Range 0 to 1 |
|---|---|---|
| A9, 724 | Top 5% | 0 |
|  | Top 10% | .35 |
|  | Top 25% | .55 |
|  | Top 50% | .75 |
|  | Lowest 50% | 1 |

Attributes 714, 716, 718, 720, 722, and 724 are academic components of the applicant attribute matrix that provide information about the applicant's academic focus and performance. These components of the applicant attribute vector are referred to as academic components 704.

Attribute 726, A10, includes a community service attribute of the applicant 102. The community service attribute may provide an indication of an amount of time the applicant 102 has dedicated to community service or a particular type of community service, such as medical, construction, elderly care, youth care, etc. Examples for A10 are shown in TABLE 10 below.

TABLE 10

| APPLICANT ATTRIBUTE | Community Service (Hours) | VALUE Range 0 to 1 |
|---|---|---|
| A10, 726 | 0 | 0 |
| | 1-25 | .35 |
| | 26-75 | .55 |
| | 76-125 | .75 |
| | >125 | 1 |

Attribute 728, A11, includes an extracurricular (EC) activities attribute of the applicant 102. The EC activities attribute may provide an indication of a number and or type of EC activities performed by the applicant. Examples for A11 are shown in TABLE 11 below.

TABLE 11

| APPLICANT ATTRIBUTE | Extracurricular Activities | VALUE Range 0 to 1 |
|---|---|---|
| A11, 728 | Academic | 0 |
| | Activism | .25 |
| | Arts | .50 |
| | Athletic | .75 |

Attribute 730, A12, includes an overall grade point average (GPA) of the applicant 102. Examples for A12 are shown in TABLE 12 below.

TABLE 12

| APPLICANT ATTRIBUTE | Overall GPA (4.0 Scale) | VALUE Range 0 to 1 |
|---|---|---|
| A12, 730 | <2.0 | 0 |
| | 2.0-2.49 | .35 |
| | 2.5-2.99 | .55 |
| | 3.0-3.50 | .75 |
| | >3.50 | 1 |

Attribute 732, A13, includes an overall class rank of the applicant 102 which can be indicated as a percentage from a highest rank. Examples for A13 are shown in TABLE 13 below.

TABLE 13

| APPLICANT ATTRIBUTE | Overall Class Rank | VALUE Range 0 to 1 |
|---|---|---|
| A13, 732 | Top 5% | 0 |
| | Top 10% | .35 |
| | Top 25% | .55 |
| | Top 50% | .75 |
| | Lowest 50% | 1 |

Attribute 734, A14, includes a well-roundedness (WR) of the applicant 102. The WR score is calculated by the application management engine 162, and is a numerical representation of a well-roundedness of the applicant 102. The WR score is a numerical value in a range from 0 to 1, 0 to 100, or any other numerical range. For example, an applicant with a GPA of 3.5, >125 hours of community service, and participation in an EC activity has a higher WR score than an applicant with a GPA of 3.9 with no EC activities or community service. Examples for A14 are shown in TABLE 14 below.

TABLE 14

| APPLICANT ATTRIBUTE | WR Score (0-100 Scale) | VALUE Range 0 to 1 |
|---|---|---|
| A14, 734 | 0-25 | 0 |
| | 26-50 | .25 |
| | 51-75 | .50 |
| | 75-100 | 1.00 |

Attributes 726, 728, 730, 720, 732, and 734 are cumulative components of the applicant attribute matrix that provide information about the applicant's overall well-roundedness and performance. These components of the applicant attribute vector are referred to as cumulative components 706.

Attribute(s) 736 are expansion attributes that may compliment the other attributes included in FIG. 7. Examples of these expansion attributes include additional applicant attributes such as an additional major or research focus, industry work experience, etc. The expansion attributes can be categorized under the biographical components 702, academic components 704, or cumulative components 706. These too would have exemplary value ranges between 0 and 1.

FIG. 8 is a data structure of a prioritization matrix with entries that provide an indication of what the scholarship approvers 104 may consider to be important applicant attributes when deciding who to award scholarships to and are used to generate the AQS. According to some aspects, the components of the prioritization matrix may be of the same type and number as the components of the applicant attribute vector of FIG. 7.

Attribute 808, P1, relates to an age of an applicant. The values for attribute P1 range between 0 and 1, and an example breakdown of how the values are mapped into the number of publications in the subject area is shown in TABLE 15.

TABLE 15

| MATRIX ENTRY | Age | VALUE Range 0 to 1 |
|---|---|---|
| P1, 808 | <18 | .2 |
| | 18-22 | .4 |
| | 23-28 | .6 |
| | 28-35 | .8 |
| | >35 | 1 |

Attribute 810, P2, includes gender of the applicant. Example values for P2 are shown in TABLE 16 below.

TABLE 16

| MATRIX ENTRY | Gender | VALUE Range 0 to 1 |
|---|---|---|
| P2, 810 | Male | 0 |
| | Female | 0.5 |
| | Other | 1 |

Attribute 812, P3, includes a hometown the applicant, which can be indicated as a particular country or region of a country. Example values for P3 are shown in TABLE 17 below.

TABLE 17

| MATRIX ENTRY | Hometown/Region | VALUE Range 0 to 1 |
|---|---|---|
| P3, 812 | Northern Region | 0 |
|  | Southern Region | 0.25 |
|  | Eastern Region | 0.75 |
|  | Western Region | 1 |

Attribute 814, P4, includes an ethnicity of an applicant. Example values for P4 are shown in TABLE 18 below.

TABLE 18

| MATRIX ENTRY | Ethnicity | VALUE Range 0 to 1 |
|---|---|---|
| P4, 814 | African | 0 |
|  | Caucasian/European | .25 |
|  | Hispanic or Latino | .50 |
|  | Asian | .75 |
|  | Arab/Middle Eastern | 1 |

Attributes 802, 810, 812, and 814 are biographical components of the applicant attribute matrix that provide basic biographical information about the applicant. These components of the applicant attribute vector are referred to as biographical components 802.

Attribute 816, P5, includes a number of semesters until graduation of the applicant. Example values for P5 are shown in TABLE 19 below.

TABLE 19

| MATRIX ENTRY | # of Semesters to Graduation | VALUE Range 0 to 1 |
|---|---|---|
| P5, 816 | >4 | 0 |
|  | 3-4 | .25 |
|  | 2 | .50 |
|  | 1 | .75 |
|  | 0 | 1 |

Attribute 818, P6, includes a major focus of study of the applicant 102. The major can include a category of majors or specific majors. Examples for A6 are shown in TABLE 20 below.

TABLE 20

| MATRIX ENTRY | Major | VALUE Range 0 to 1 |
|---|---|---|
| P6, 818 | Arts/Humanities | 0 |
|  | Sciences | .35 |
|  | Biomedical Engineering | .55 |
|  | Electrical Engineering | .75 |
|  | Other Engineering | 1 |

Attribute 820, P7, includes a grade point average (GPA) of the applicant 102 within the applicant's major focus of study. Examples for P7 are shown in TABLE 21 below.

TABLE 21

| MATRIX ENTRY | Major GPA (4.0 Scale) | VALUE Range 0 to 1 |
|---|---|---|
| P7, 820 | <2.0 | 0 |
|  | 2.0-2.49 | .35 |
|  | 2.5-2.99 | .55 |

TABLE 21-continued

| MATRIX ENTRY | Major GPA (4.0 Scale) | VALUE Range 0 to 1 |
|---|---|---|
|  | 3.0-3.50 | .75 |
|  | >3.50 | 1 |

Attribute 822, P8, includes a research focus of the applicant 102 within the applicant's major focus of study. Examples for P8 within a biomedical engineering major are shown in TABLE 22 below.

TABLE 22

| MATRIX ENTRY | Research Focus | VALUE Range 0 to 1 |
|---|---|---|
| P8, 822 | Biomaterials and Drug Delivery | 0 |
|  | Biomedical Mechanics | .35 |
|  | Imaging and Instrumentation | .55 |
|  | Micro- and Nano-biotechnology | .75 |
|  | Molecular, Cellular, and Tissue Engineering | 1 |

Attribute 824, P9, includes a class rank of the applicant 102 within the applicant's major focus of study which can be indicated as a percentage from a highest rank. Examples for P9 are shown in TABLE 23 below.

TABLE 23

| MATRIX ENTRY | Class Rank in Major | VALUE Range 0 to 1 |
|---|---|---|
| P9, 824 | Top 5% | 0 |
|  | Top 10% | .35 |
|  | Top 25% | .55 |
|  | Top 50% | .75 |
|  | Lowest 50% | 1 |

Attributes 814, 816, 818, 820, 822, and 824 are academic components of the applicant attribute matrix that provide information about the applicant's academic focus and performance. These components of the applicant attribute vector are referred to as academic components 804.

Attribute 826, P10, includes a community service attribute of the applicant 102. The community service attribute may provide an indication of an amount of time the applicant 102 has dedicated to community service or a particular type of community service, such as medical, construction, elderly care, youth care, etc. Examples for P10 are shown in TABLE 24 below.

TABLE 24

| MATRIX ENTRY | Community Service (Hours) | VALUE Range 0 to 1 |
|---|---|---|
| P10, 826 | 0 | 0 |
|  | 1-25 | .35 |
|  | 26-75 | .55 |
|  | 76-125 | .75 |
|  | >125 | 1 |

Attribute 828, P11, includes an extracurricular (EC) activities attribute of the applicant 102. The EC activities attribute may provide an indication of a number and or type of EC activities performed by the applicant. Examples for P11 are shown in TABLE 25 below.

TABLE 25

| MATRIX ENTRY | Extracurricular Activities | VALUE Range 0 to 1 |
|---|---|---|
| P11, 828 | Academic | 0 |
| | Activism | .25 |
| | Arts | .50 |
| | Athletic | .75 |

Attribute 830, P12, includes an overall grade point average (GPA) of the applicant 102. Examples for P12 are shown in TABLE 26 below.

TABLE 26

| MATRIX ENTRY | Overall GPA (4.0 Scale) | VALUE Range 0 to 1 |
|---|---|---|
| P12, 830 | <2.0 | 0 |
| | 2.0-2.49 | .35 |
| | 2.5-2.99 | .55 |
| | 3.0-3.50 | .75 |
| | >3.50 | 1 |

Attribute 832, P13, includes an overall class rank of the applicant 102 which can be indicated as a percentage from a highest rank. Examples for P13 are shown in TABLE 27 below.

TABLE 27

| MATRIX ENTRY | Overall Class Rank | VALUE Range 0 to 1 |
|---|---|---|
| P13, 832 | Top 5% | 0 |
| | Top 10% | .35 |
| | Top 25% | .55 |
| | Top 50% | .75 |
| | Lowest 50% | 1 |

Attribute 834, P14, includes a well-roundedness (WR) of the applicant 102. The WR score is a numerical value in a range from 0 to 1, 0 to 100, or any other numerical range. For example, an applicant with a GPA of 3.5, >125 hours of community service, and participation in an EC activity has a higher WR score than an applicant with a GPA of 3.9 with no EC activities or community service. Examples for P14 are shown in TABLE 28 below.

TABLE 28

| MATRIX ENTRY | WR Score (0-100 Scale) | VALUE Range 0 to 1 |
|---|---|---|
| P14, 834 | 0-25 | 0 |
| | 26-50 | .25 |
| | 51-75 | .50 |
| | 75-100 | 1.00 |

Attributes 826, 828, 830, 820, 832, and 834 are cumulative components of the applicant attribute matrix that provide information about the applicant's overall well-roundedness and performance. These components of the applicant attribute vector are referred to as cumulative components 806.

Attribute(s) 836 are expansion attributes that may compliment the other attributes included in FIG. 8. Examples of these expansion attributes include additional applicant attributes such as an additional major or research focus, industry work experience, etc. The expansion attributes can be categorized under the biographical components 802, academic components 804, or cumulative components 806. These too would have exemplary value ranges between 0 and 1.

Figure 9:
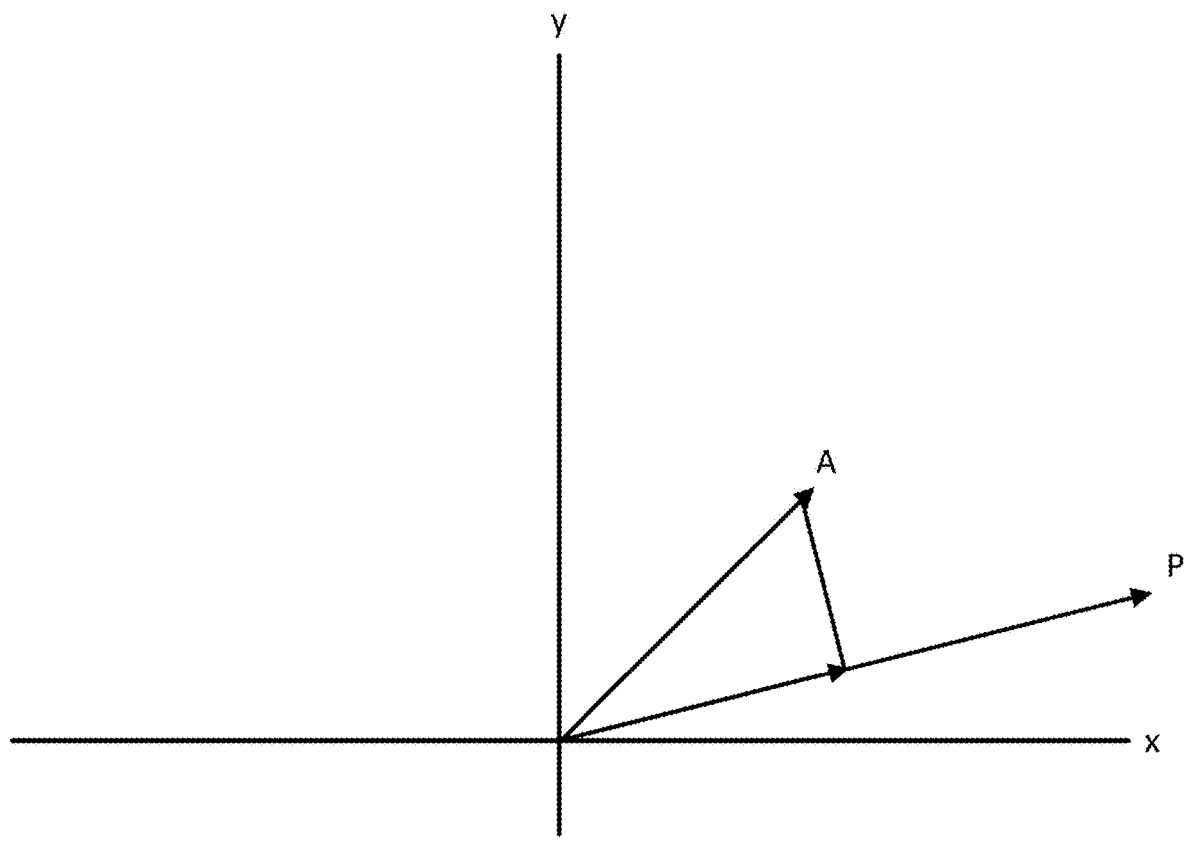
FIG. 9 is a graph of an applicant attribute vector and a prioritization matrix in two dimensional space.

Next, FIG. 9 is a graph of an applicant attribute vector and a prioritization matrix in two dimensional space, according to certain embodiments. As seen, the applicant attribute vector, A, may reflect some but not all of the attributes covered by one particular prioritization matrix, P. If this is the case, the magnitude of the projection vector of the applicant attribute vector, A, onto the prioritization matrix, P, may indicate an amount of commonality between the two vectors. Accordingly, the AQS calculated by the AQS calculation engine 135 is a numerical representation of the commonality between the applicant attribute vector, A, and the prioritization matrix, P.

Although there are different axes x and y shown, these axes are not necessarily orthogonal, but instead have some attributes in one of the vectors (A or P) that are correlated with other attributes in other vectors. Nevertheless, in order to identify how a set of applicant attribute data maps into the two domains, a mapping process is performed to see how the applicant attribute vector maps onto one or more prioritization matrices. The magnitude of the vectors along each axis is a function of the additive values of the attributes that make up the vector. For example, in the applicant attribute vector, the range of values of a major GPA may be 0.00 to 4.00, for example. The maximum contribution to the magnitude of the A vector is if the applicant has the same major GPAA as the major GPA entry in the corresponding prioritization matrix. This particular attribute (major GPA) can then be weighted based on a weighting table (as will be discussed) to help normalize the amount of contribution that attribute may have relative to other attributes that make up the vector.

Figure 10:
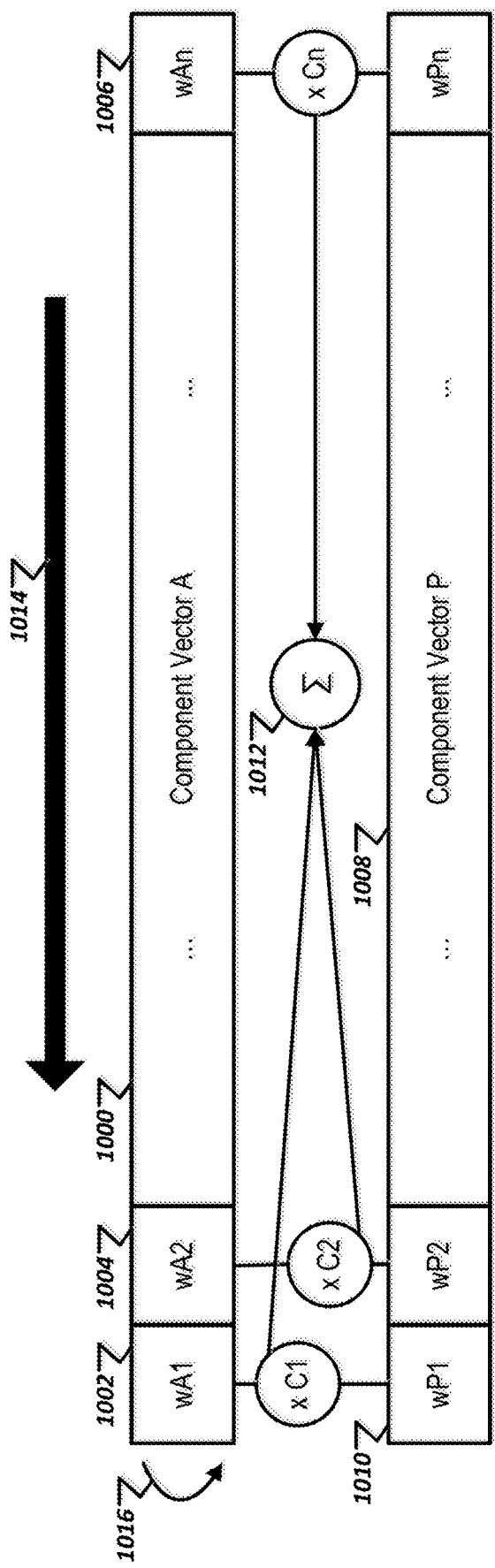
FIG. 10 is a graphical illustration of an applicant quality score calculation.

FIG. 10 is a graphical illustration of how pairs of vectors (P, A) are compared to one another to arrive at a determination of an amount of commonality between the two vectors (e.g., the AQS), according to certain embodiments. FIG. 10 includes vector A 1000 with exemplary weighted attributes w1 aA1 1002, w2 aA2 1004, and wnaAn 1006 (the weights are shown for brevity in the Figure as w), although other weighted attributes would be included in the process. The respective weights are set based on the query that is made based on the application data 122 extracted from the submitted scholarship application. Vector P 1008 includes similar weighted attributes, such as w1pP1. Weighting the attributes adjusts the spatial size associated with that particular attribute, thus affecting the potential size of the correlation graph for that particular vector (e.g., it affects how big the A shape is on the correlation vector, for example). Weighting the correlation calculations adjusts the relative contributions each pair of components (e.g., A1P1) contributes to an overlap area in the correlation graph (e.g., the projection of the A vector onto the P vector).

In a first multiplication step, w1aA1 1002 is multiplied with w1pP1 1010, and the product is multiplied by a correlation weight C1 and the result sent to an accumulator (summation device) 1012. The correlation weight C1 is a coefficient that adjusts the level of relevance for the matching pair for the query made. The products from the other matching pairs of weighted components from the vectors are multiplied (e.g., w2aA2×w2pP2 . . . wnaAn×wnpPn), adjusted by their respective correlation weight (Cx, x being an index), and summed in the accumulator 1012. Then the weighted attributes in one vector (vector A 1000 in this example) are shifted left 1014 by one position and then then are multiplied by the corresponding weighted attribute in vector P 1008 and correlation weight C2. For example, in the second step w2aA2 1004 is multiplied by w1pP1 1010 and the product is multiplied by a correlation weight Cx and the result is summed with the other products in the accumulator 1012. The one exception is that the left most weighted attribute (which in this case is w1aA1) is circular shifted right 1016 so as to take the position of wnaAn 1006. This process continues until all of the weighted attributes of one vector are multiplied, adjusted by a correlation weight, and summed with all the other attributes of the other vector.

With regard to the weights, each attribute of each vector is first weighted such that each attribute is either weighted with a 0 or a value between zero and 1. A zero value means that the subject attribute does not contribute at all. Values closer to 1 are deemed to be associated with attributes that have a higher relevance toward attributes of an ideal candidate for the scholarship. Each attribute of each vector is then combined (multiplied in this example, but could also be added or combined in another mathematical fashion) with each attribute of the other vectors, and a resultant sum is obtained. The weighted vector correlation of the A and P vectors results in the overlap area of the two vectors.

While in the above-described embodiment, there a fixed weight is assigned to each attribute for each vector. However, for an even more refined correlation process, a separate weight is applied for each attribute for each multiplication performed. For example, there may be a high correlation between an applicant who has a high well-roundedness score and the quality of the applicant. However, there may be little correlation weight for the ethnicity or hometown of the applicant.

Each query will have a relevant subset of weights for each vector (signifying the contribution of each particular attribute to each vector space in the correlation graph (e.g., the size of region A). Furthermore the correlation between the two spaces (e.g., between A and P) is influenced by the weight of the correlation of each pair of vector attributes (e.g., A1, P1) for that particular query. The tables below include the attribute weights and correlation weights for each inquiry. For any weight or coefficient not particularly provided for, its value is set at 0.5, although it may be changed to any value ranging between 0 and 1.

Attribute Weight table for a biomedical engineering scholarship.

TABLE 29

| Attribute | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| A | .8 | 1 | .6 | .7 | .7 | .8 | .6 | .8 | .8 | .9 | .7 | 1 | .5 | .7 |
| P | .8 | .9 | .8 | .9 | 1 | .9 | .8 | .7 | .6 | .5 | .4 | .3 | .8 | .2 |

A vector Correlation Coefficient Table for P regarding the biomedical engineering scholarship.

TABLE 30

| Attribute | CCp1 | CCp2 | CCp3 | CCp4 | CCp5 | CCp6 | CCp7 | CCp8 | CCp9 | CCp10 | CCp11 |
|---|---|---|---|---|---|---|---|---|---|---|---|
| A1 | 1 | .8 | .8 | .8 | 1 | .8 | .6 | .4 | .2 | .1 | .1 |
| A2 | 1 | .8 | .8 | .8 | 1 | .8 | .6 | .4 | .2 | .1 | .1 |
| A3 | 1 | .8 | .8 | .8 | 1 | .8 | .6 | .4 | .2 | .1 | .1 |
| A4 | .8 | .8 | .6 | .8 | .8 | .6 | .4 | .2 | .1 | .1 | .1 |
| A5 | .8 | .8 | .6 | .8 | .8 | .6 | .4 | .2 | .1 | .1 | .1 |
| A6 | 1 | 1 | 1 | 1 | 1 | 1 | 1 | 1 | 1 | 1 | 1 |
| A7 | .8 | .8 | .6 | .8 | .8 | .6 | .4 | .2 | .1 | .1 | .1 |
| A8 | .9 | .9 | .7 | .8 | .9 | .7 | .5 | .3 | .1 | 0 | .5 |
| A9 | .9 | .9 | .7 | .8 | .9 | .7 | .5 | .3 | .1 | 0 | .5 |
| A10 | .9 | .9 | .7 | .8 | .9 | .7 | .5 | .3 | .1 | 0 | .5 |
| A11 | .9 | .9 | .7 | .8 | .9 | .7 | .5 | .3 | .1 | 0 | .5 |
| A12 | .9 | .9 | .7 | .8 | .9 | .7 | .5 | .3 | .1 | 0 | .5 |
| A13 | .8 | .6 | .3 | .5 | .2 | .8 | .9 | .2 | .6 | .4 | .5 |
| A14 | .7 | .8 | .9 | .5 | .6 | .7 | .7 | .6 | .4 | .3 | .5 |

This process of identifying attributes, weights and correlation coefficients may be applied to other A-P correlation space analyses for different prioritization matrices as well as other database queries. Similar weight and coefficient tables are stored for other types of scholarships managed by the scholarship management system 108.

Figure 11:
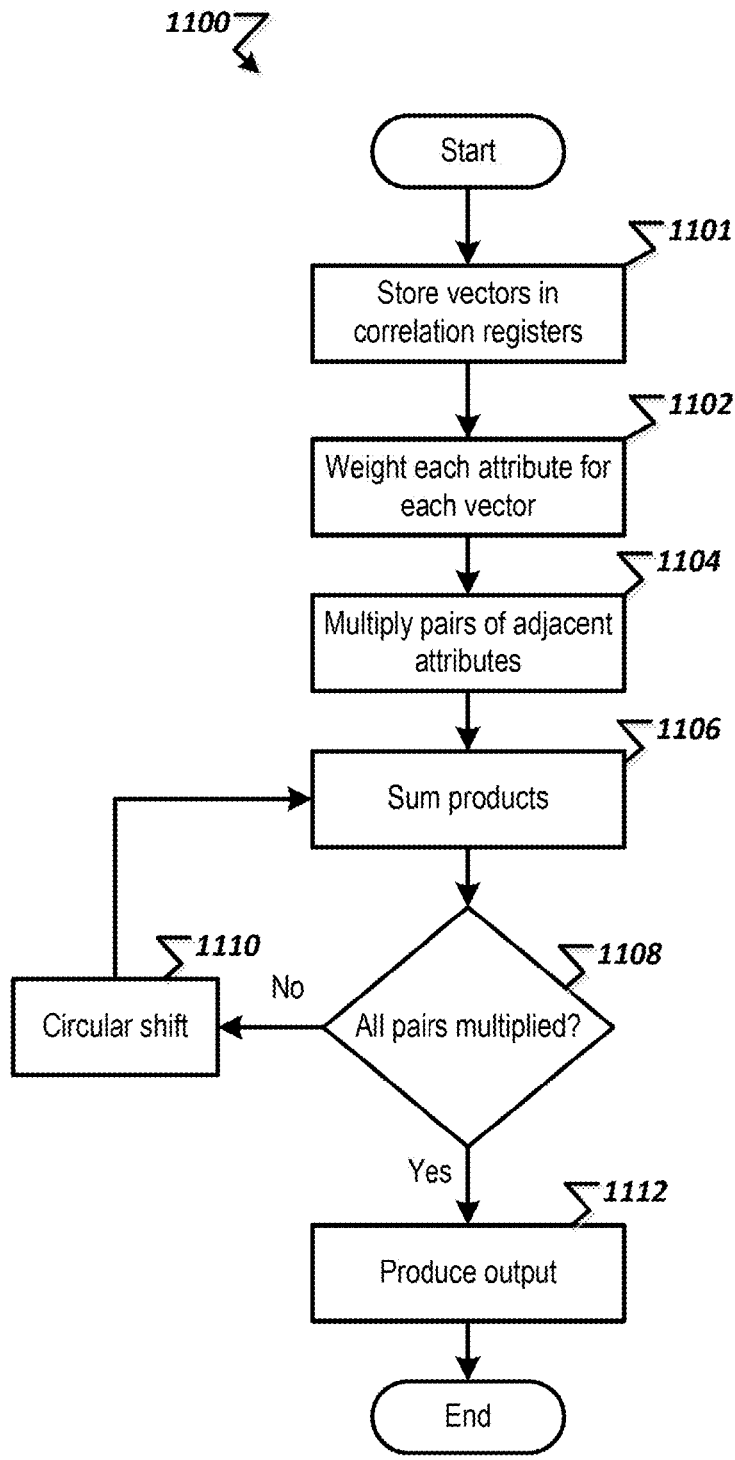
FIG. 11 is a flowchart of a vector overlap process.

Next, FIG. 11 is a flowchart of a vector overlap process 1100 for determining the overlap amounts for the applicant attribute vector and the prioritization matrix for a particular scholarship, according to certain embodiments. The vector overlap process 1100 is controlled by the AQS calculation engine 135. For example, the AQS calculation engine 135 automatically triggers other processing engines of the scholarship management system 108 in real-time to perform one or more steps of the vector overlap process 1100 and processes the data received from the other processing engines in accordance with the steps of the process 1100. The AQS calculation engine 135 automatically calculates the AQS for an applicant 102 in response to the generation of an applicant attribute vector by the application management engine 162.

The process begins at step 1101 where the AQS calculation engine 135 stores the prioritization matrix for the scholarship in a first correlation register and the applicant attribute vector for the applicant 102 in a second correlation register.

At step 1102 where each of the vector attributes has a weight applied thereto. The weights are stored in a memory table of the prioritization data 156 with the corresponding prioritization matrix. The process then proceeds to step 1104 where pairs of weighted adjacent attributes are multiplied with each other, and then in 1106 the products of all the multiplications are accumulated. Then in step 1108 a query is made regarding whether all the pairs of attributes have been multiplied. If the response to the query is negative, the process proceeds to step 1110 where the attributes in one vector are circular shifted and the process then returns to step 1104. However, if the response to the query in Step 1108 is affirmative, the process proceeds to 1112, where the cumulative output is produced and used for graphical analysis. The value that is output is fraction of the total overlap if the max weight is applied to the max value of all attributes for all vectors and the correlation is performed on that maximum condition. Moreover, the output that is produced at step 1112 can be a percentage of the maximum possible overlap space for the applicant attribute vector and the different component prioritization matrices.

The output produced at step 1112 corresponds to the AQS is then sent to the application management engine 162, which generates the automatic scholarship prediction as previously discussed. If the vector overlap process 1100 is performed in conjunction with potential applicant identification process 200, then the output produced at step 1112 is sent to the potential applicant ID engine 133.

Figure 12:
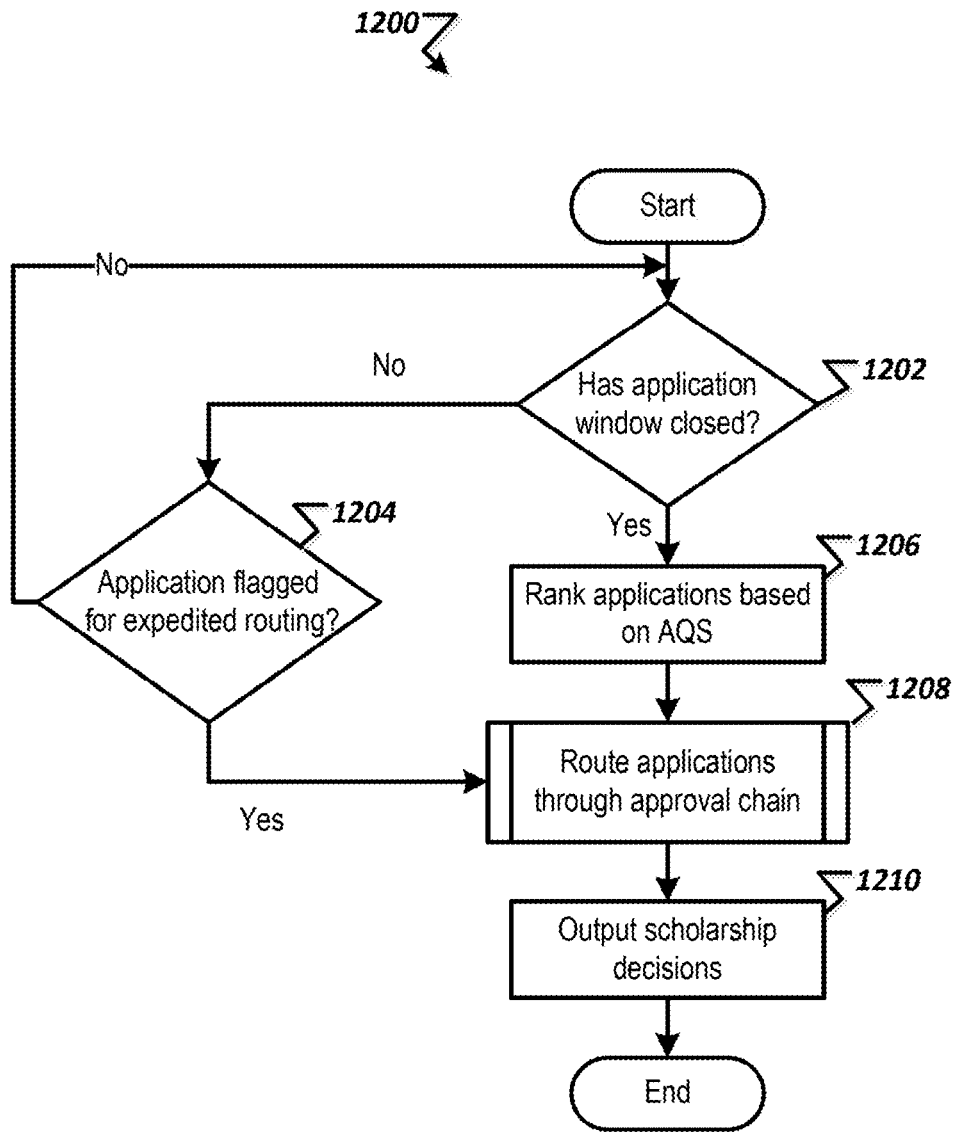
FIG. 12 is a flowchart of a scholarship application approval process.

FIG. 12 is an exemplary flowchart of a scholarship application approval process 1200. The scholarship application approval process 1200 is controlled by the scholarship approval engine 131, which automatically triggers other processing engines of the scholarship management system 108 in real-time to perform one or more steps of the scholarship application approval process 1200 and processes the data received from the other processing engines in accordance with the steps of the process 1200.

At step 1202, the scholarship approval engine 131 determines whether the application window has closed. If the application window has closed, resulting in a "yes" at step 1202, then step 1206 is performed. Otherwise, if the application window has not closed, resulting in a "no" at step 1202, then step 1204 is performed.

At step 1206, in response to determining that the application window has closed, the scholarship approval engine 131 automatically triggers the ranking engine 160 to rank the received applications for a particular scholarship according to the calculated AQS for each applicant.

At step 1204, if the application window has not closed, the scholarship approval engine 131 determines whether or not the received application has been flagged for expedited routing based on whether received application was identified as a potential applicant and if that potential applicant expressed an interest level of "very interested" or "maybe interested" in applying for the scholarship when replying to the scholarship interest inquiry. If the application was flagged for expedited routing, resulting in a "yes" at step 1204, then the process continues to step 1208, and the scholarship approval engine 131 automatically routes the application through the approval chain whether or not the application window has closed. If the application was not flagged for expedited routing, resulting in a "no" at step 1204, then then the received application remains in a queue until the application window closes, and the process returns to step 1202.

At step 1208, in response to receiving the ranked applicants from the ranking engine 160 or in response to receiving a scholarship application that is flagged for expedited routing, the scholarship approval engine 131 routes the applications through the approval chain by performing a scholarship routing process. Details regarding the scholarship routing process are discussed further herein.

At step 1210, once the applications have been routed through the approval chain and award decisions have been determined, the scholarship approval engine 131 triggers awarded scholarship management engine 134 to output awarded scholarship information to the applicants 102 who have been awarded scholarships. The awarded scholarship information can be output to the applicants with digital signatures or stamps that indicate the award amount. The awarded scholarship management engine 134 also stores the awarded scholarship information as awarded scholarship data 154 in the data repository 114, which can be used in future scholarship application cycles to generate the prioritization matrix, allocate funds, identify potential applications, etc. The awarded scholarship management engine 134 can also interface with financial institutions of the applicants 102 and the university to transfer scholarship funds from the university to the applicants 102 who are awarded the scholarships.

Figure 13:
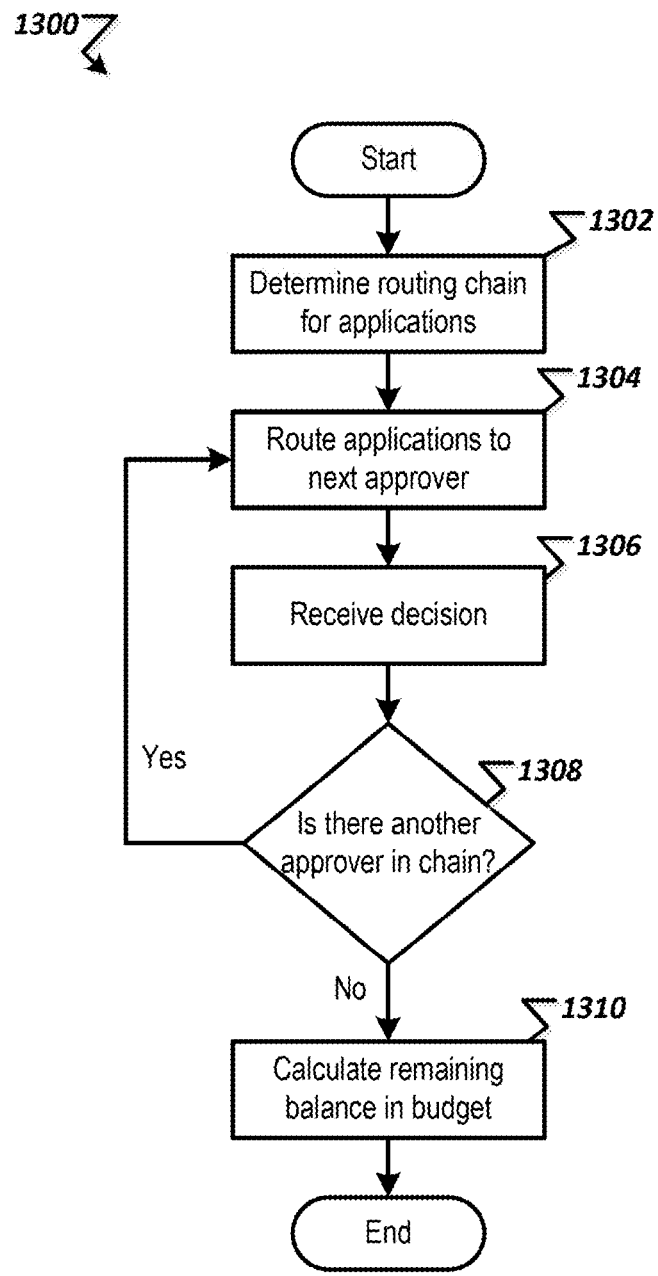
FIG. 13 is a flowchart of a scholarship routing process.

FIG. 13 is an exemplary flowchart of a scholarship routing process 1300. The scholarship routing process 1300 is controlled by the scholarship approval engine 131, which automatically triggers other processing engines of the scholarship management system 108 in real-time to perform one or more steps of the scholarship routing process 1300 and processes the data received from the other processing engines in accordance with the steps of the process 1300.

At step 1302, the scholarship approval engine 131 determines an approval chain for a particular scholarship based on approver data 124 stored in the data repository 114. For example, an electrical engineering scholarship may be routed through an electrical engineering department chairman while a medical school scholarship may be routed through a medical school dean or chairman. In some implementations, the approvers 104 for a particular scholarship for an internal applicant includes one or more of a department chairman, a college dean, a scholarship committee chairman, or a university chairman. For an external applicant, the approval chain may also include a dean of higher education and a member of ministry of education in addition to the approvers 104 for the internal applicants.

At step 1304, the scholarship approval engine 131 routes the applications for a particular scholarship to a next approver in the approval chain. In some implementations, the scholarship approval engine 131 triggers the GUI engine 140 to output an approver interface screen to each of the approvers 104 as the applications for the scholarship are routed through the approval chain. The approver interface screen is a dashboard that provides the approvers 104 with various types of data that can include scholarship statistics from previous application cycles, a quick-view list of the applicants 102 for the scholarship with the corresponding AQS, scholarship award statistics for the current application cycle, etc.

At step 1306, the scholarship approval engine 131 receives the decision from the approver 104. The approver user interface screen provides the approvers the ability to approve or deny a scholarship award to a particular applicant, input an award amount, and input additional information related to why the approver awarded or did not award the scholarship to the particular applicant. The approver user interface screen can also include the decisions by the previous reviewers in the approval chain so that a final approver can select applicants for scholarship awards based on inputs received from the other approvers 104 in the approval chain. In some implementations, the scholarship award decision made by the final approver in the approval chain is a final award decision.

At step 1308, the scholarship approval engine 131 determines whether or not there is another approver in the approval chain. If a current approver is not the final approver, resulting in a "yes" at step 1308, then the process proceeds to step 1304 to route the applications to the next approver in the approval chain. If the current approver is the final approver, resulting in a "no" at step 1308, then step 1310 is performed.

At step 1310, in response to receiving the final award decision, the scholarship approval engine 131 triggers a budget management engine 144 to calculate a remaining balance in a scholarship budget and/or modify a total scholarship budget based on the total amount of money awarded for the scholarship. In some implementations, based on an amount of money awarded in scholarships by the scholarship management system 108 for a scholarship application window, the budget management engine 144 may determine that an additional scholarship application window can be opened and can allocate any remaining money in a scholarship budget to one or more scholarships that can be awarded during the additional scholarship window. For example, if the remaining scholarship budget is greater than a predetermined threshold amount of money, the budget management engine 144 may determine that the additional application window can be opened.

Figure 14A:
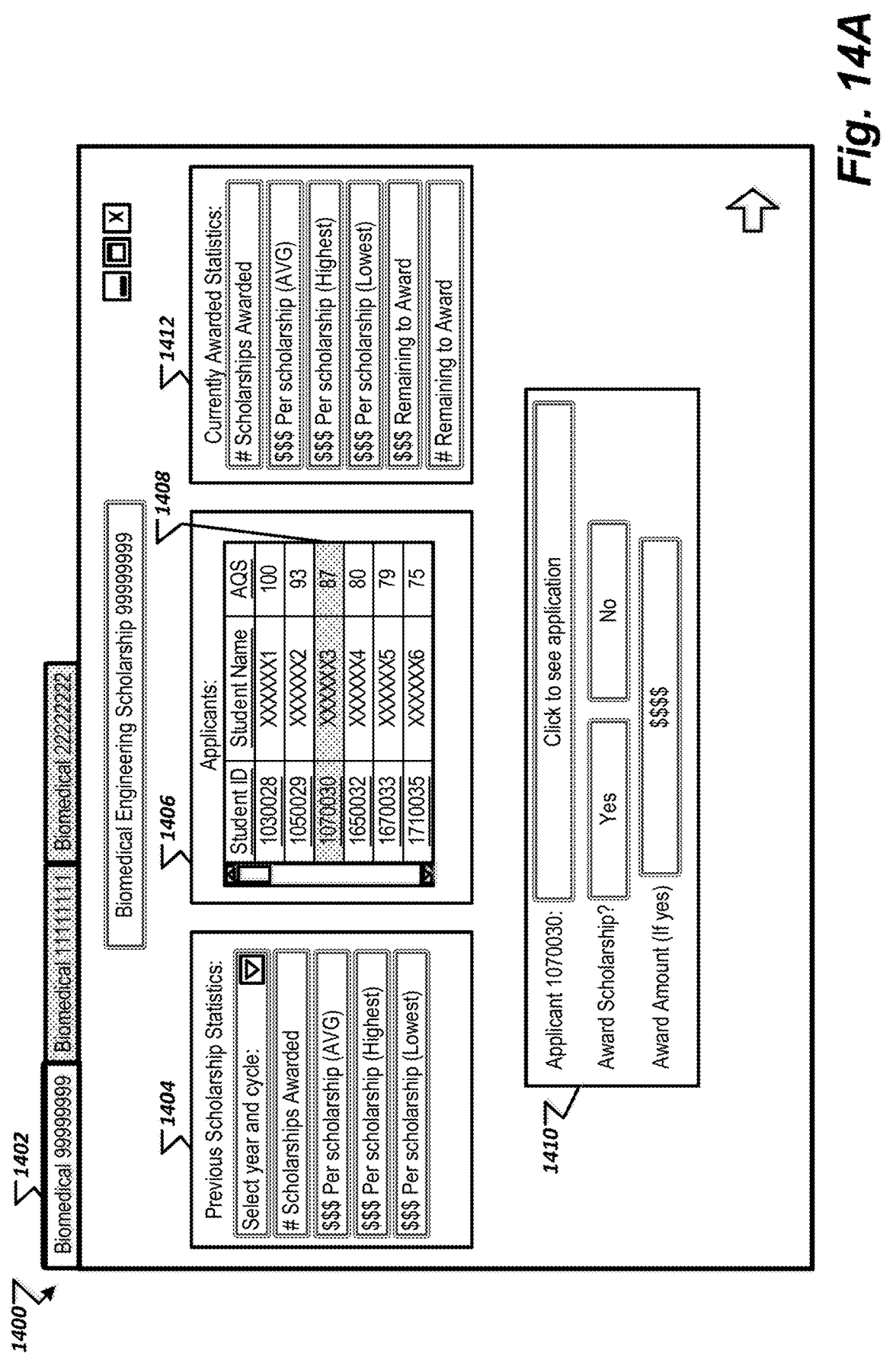

FIG. 14A is an exemplary screenshot of a scholarship approver UI screen 1400. The scholarship approver UI screen 1400 may be output by the GUI engine 140 to the approvers 104 in the approval chain for a scholarship. The scholarship approver UI screen 1400 includes multiple data fields and input fields that allow approvers 104 to view information related to the scholarship and the applicants 102 who have applied for the scholarship. A scholarship identification tab 1402 indicates which scholarship the approver 104 is viewing applications for. For example, the scholarship application tab 1402 can include a major or research area along with a serial number that uniquely identifies the scholarship. In some implementations where the approver 104 is in the approval chain for multiple scholarships, the scholarship approver UI screen can include multiple scholarship identification tabs 1402 associated with each of the scholarships that can be selected by the approver.

At data field 1404, the GUI engine 140 outputs scholarship statistics for previous application cycles that may aid the approvers 104 in making scholarship award decisions. For example, for a selected year and/or application cycle, the previous scholarship statistics can include a number of a particular type of scholarship awarded, an average award amount per scholarship, a highest award amount for the scholarship, and a lowest award amount for the scholarship.

At data input field 1406 of the scholarship approver UI screen 1400, the GUI engine 140 outputs a list of the applicants 102 who have applied for the scholarship along with a student identification number and the corresponding AQS that was calculated for the applicant by the AQS calculation engine 135. The approver 104 can select an applicant 1408 from the data input field 1406, and in response, the GUI engine 140 outputs an applicant award decision field 1410 where the approver 104 can view the application submitted by the applicant and indicate a recommendation of whether or not to award the scholarship along with a recommended award amount.

At data field 1412, the GUI engine 140 outputs currently awarded scholarship information that includes statistics related to the scholarships the approver has already awarded or recommended awarding for a particular scholarship or scholarship category. For example, the currently awarded scholarship information can include a number of scholarships awarded, an average award amount per scholarship, highest and lowest award amounts, an amount of money remaining to award, and a number of remaining scholarships to award.

Figure 14B:
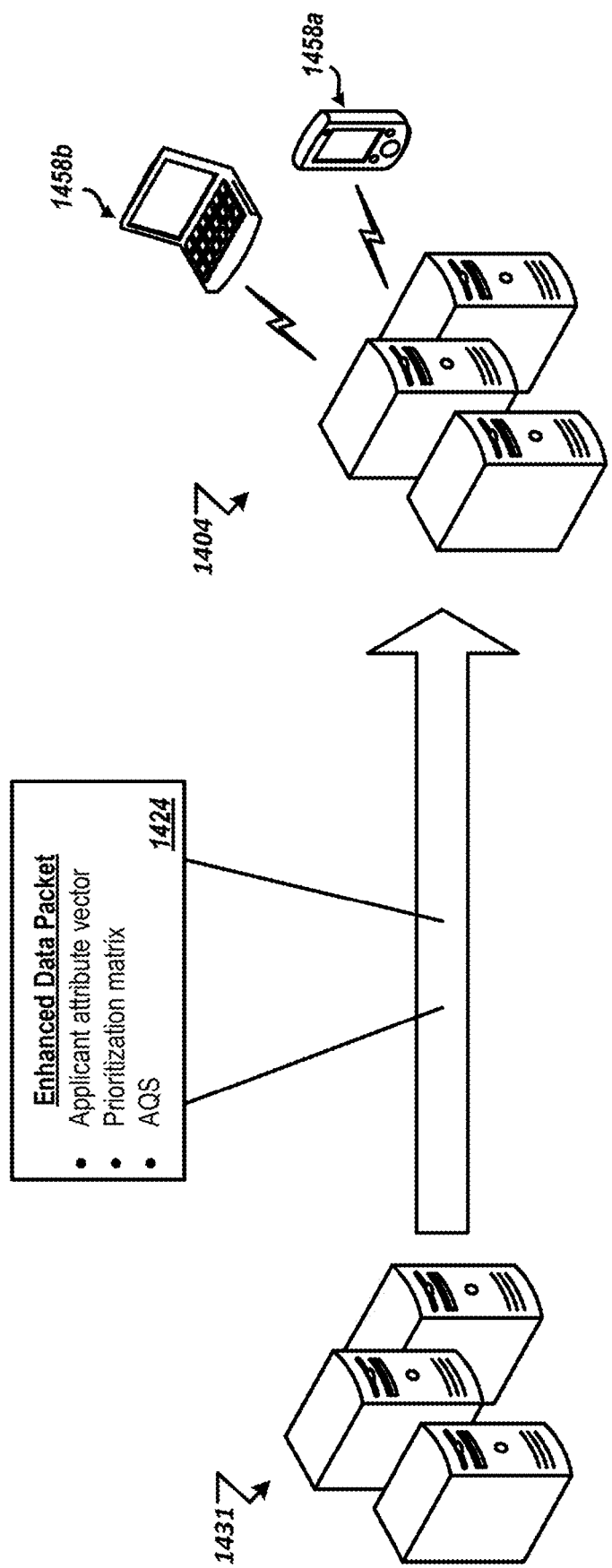
FIG. 14B is an exemplary illustration of a portion of the scholarship management environment.

FIG. 14B is an exemplary illustration of a portion of the scholarship management environment that includes computing resources of a scholarship approval engine 1431 and computing resources of an approver network 1404 that presents the scholarship approver UI screens to computing devices 1458 of the approvers 104. In some implementations, the computing resources of the approver network 1404 can be configured to perform various processes associated with the scholarship application management system 108, such as the scholarship routing process 1300 (FIG. 13). In one example, in response to detecting network/processing congestion at the scholarship approval engine 1431, the scholarship approval engine 1431 may transmit an enhanced data packet 1424 to the applicant network 1404, which can also function as a command to the applicant network 1404 to perform the scholarship routing process 1300. For example, the enhanced data packet 1424 can include at least one of one or more applicant attribute vectors for the applicants for a particular scholarship, the prioritization matrix for the scholarship, or AQSs of the applicants. By condensing the information associated with the scholarship and applicants into a single data structure that is transmitted as the enhanced data packet, vast amounts of data are condensed, which reduces computer network congestions. In addition, other processing tasks associated with other processing engines of the scholarship application management system 108 can be similarly distributed to the approver network 1404 as well as an applicant network.

Figure 15:
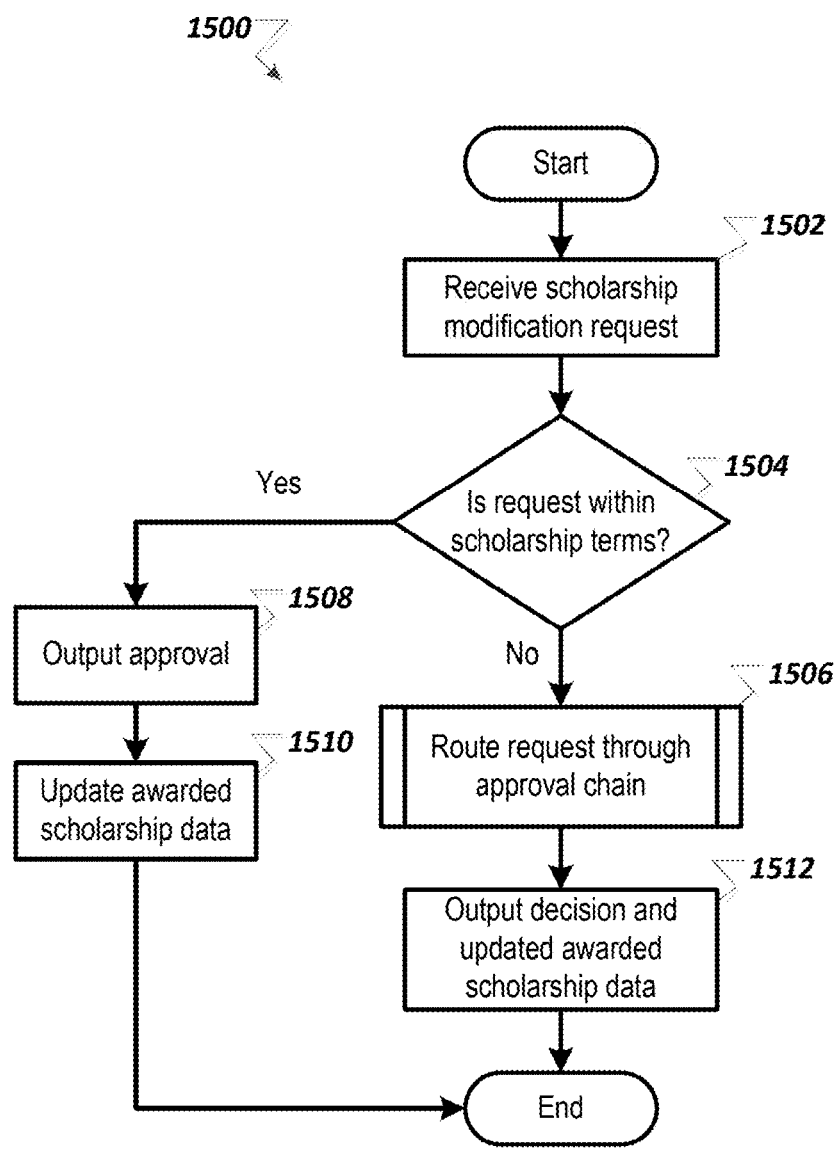
FIG. 15 is a flowchart of a scholarship modification process.

FIG. 15 is an exemplary flowchart of a scholarship modification process 1500. The scholarship modification process 1500 is controlled by the awarded scholarship management engine 134, which automatically triggers other processing engines of the scholarship management system 108 in real-time to perform one or more steps of the scholarship modification process 1500 and processes the data received from the other processing engines in accordance with the steps of the process 1500.

At step 1502, the awarded scholarship management engine 134 receives a scholarship modification request from an applicant who has been awarded a scholarship. In addition to outputting awarded scholarship information to the applicants 102 who are awarded scholarships, the awarded scholarship management engine 134 also manages scholarship modifications in response to receiving a scholarship modification request from an applicant 102. In some implementations, scholarships have benefits to the applicants 102 other than receiving an education. For example, the awarded scholarships may also allow for applicants who are awarded scholarships, also referred to as awarded applicants, to attend conferences, go on education tours, etc. The awarded applicants can submit a modification request to allocate scholarship funds to attend the conferences or go on the education tours. The awarded applicants can also submit modification requests to extend the scholarship, increase the scholarship award amount, transfer the scholarship to another institution, or terminate the scholarship. In some implementations, the awarded scholarship management engine 134 receive the scholarship modification request from the GUI engine 140 that receives a modification request at a scholarship modification UI screen where the awarded applicants can input a type of modification request as well as a reason for submitting the modification request.

At step 1504, in response to receiving the scholarship modification request, the awarded scholarship management engine 134 determines whether the request is within predetermined scholarship terms that provide for automatic approval of the request. For example, if the modification request is a request to attend a conference and the awarded scholarship data 154 for the scholarship indicates that the awarded applicant is allowed to attend one conference under the terms of the scholarship. If the modification request is within the scholarship terms, resulting in a "yes" at step 1504, then step 1508 is performed. Otherwise, if the modification request is not within the scholarship terms, resulting in a "no" at step 1504, then step 1506 is performed.

At step 1508, if the modification request is within the scholarship terms, then the awarded scholarship management engine 134 outputs an approval to the awarded applicant who is making the request and at updates the awarded scholarship data 154 in the data repository 114 to indicate that the approval was granted at step 1510.

At step 1506, if the modification request is not within the predetermined scholarship terms, then the awarded scholarship management engine 134 triggers the scholarship approval engine 131 to route the scholarship modification request through the approval chain to process the scholarship modification request by performing the scholarship routing process 1300 described previously. For example, the approval chain for the scholarship modification request is based on the type of modification request being submitted and can include one or more of the department chairman, college dean, scholarship committee chairman, or university chairman.

At step 1512, once the awarded scholarship management engine 134 receives a final modification decision from the scholarship approval engine 131, the final modification decision is output to the awarded applicant who initiated the request, and the awarded scholarship data 154 stored in the data repository 114 is updated.

Figure 16:
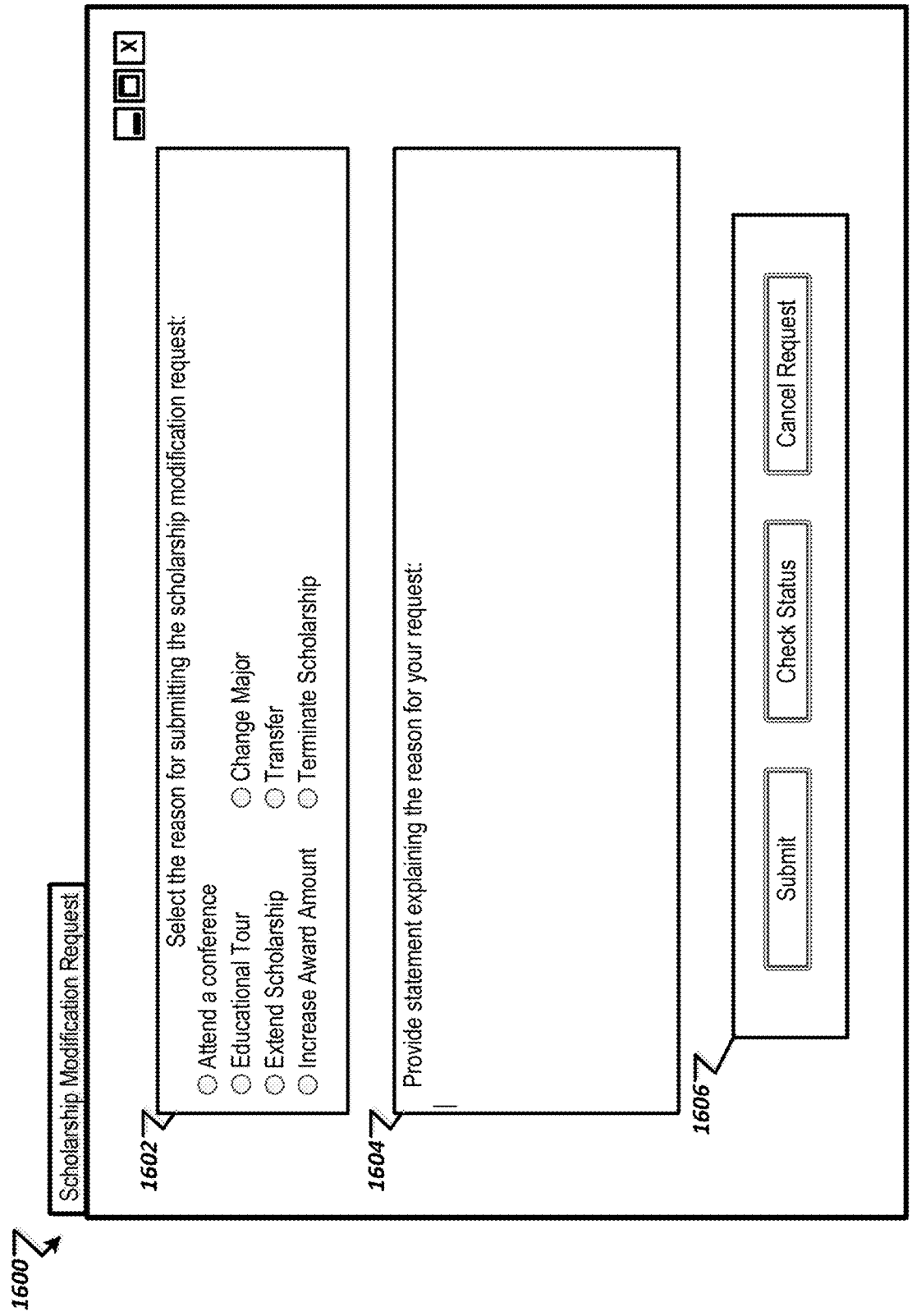
FIG. 16 illustrates a screenshot of a scholarship modification user interface screen.

FIG. 16 is an exemplary screenshot of a scholarship modification UI screen 1600. The scholarship modification UI screen 1600 may be output by the GUI engine 140 to scholarship awardees in one or more formats, such as email, notification on webpage or electronic device application, etc. The scholarship modification UI screen 1600 includes multiple data fields and input fields that allow the scholarship awardees to input information related to scholarship modification requests. For example, the GUI engine 140 outputs a modification type input field 1602 that allows the scholarship awardees to indicate the type of modification request such as attend a conference, educational tour, extend scholarship, increase award amount, change major, transfer, terminate scholarship, etc. The data input field 1604 allows the scholarship awardee to input a personal statement explaining the reason for the modification request. At data field 1606, the GUI engine 140 receives a submission selection where the scholarship awardee can submit the request, check a status of a request, or cancel a request. The GUI engine 140 passes the scholarship modification request information input at the UI screen 1600 to the awarded scholarship management engine 134 for approval.

Figure 17A:
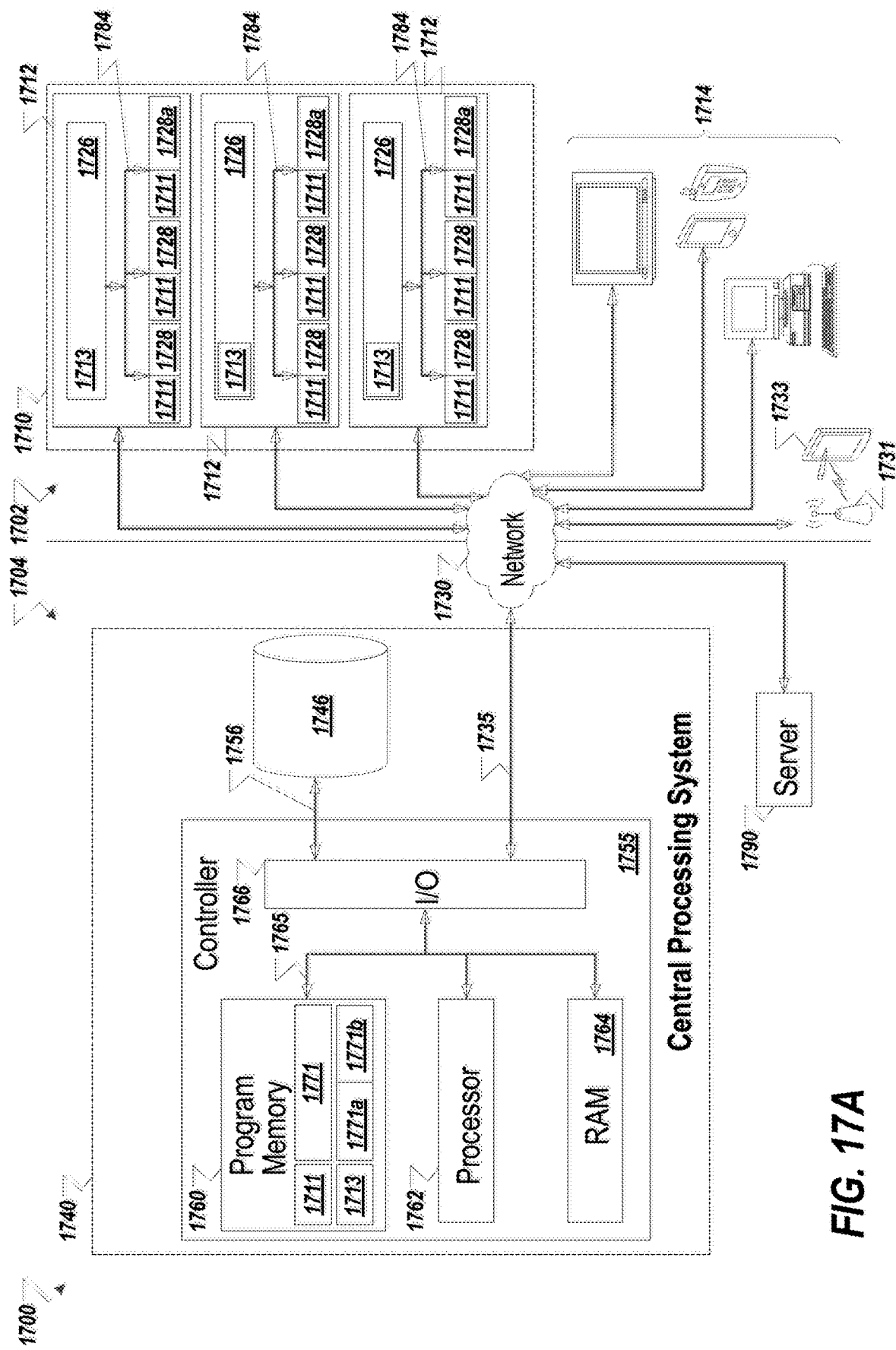
FIGS. 17A and 17B illustrate various aspects of an exemplary architecture implementing a platform for automated management of scholarship applications.
Figure 17B:
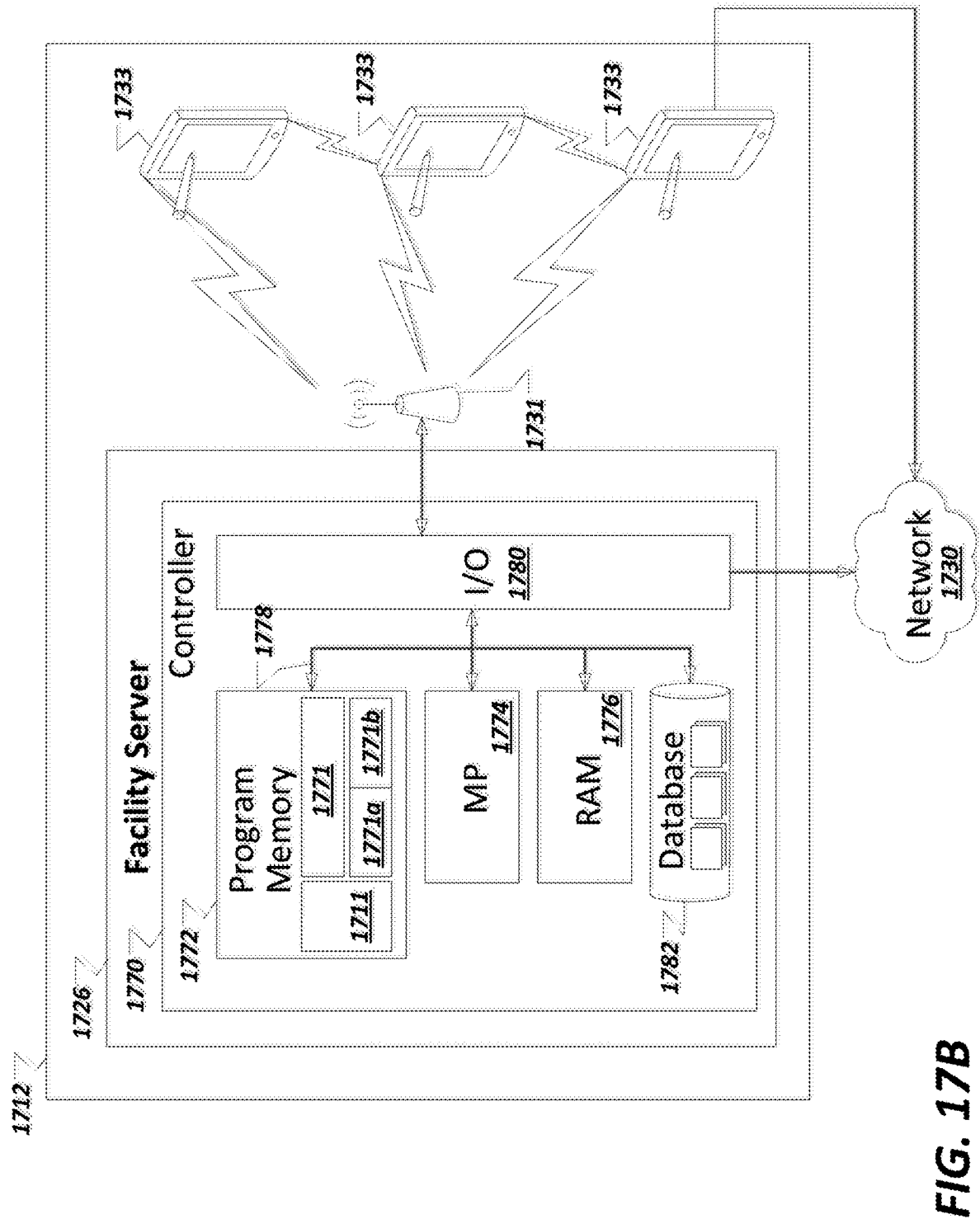

FIGS. 17A and 17B illustrate various aspects of an exemplary architecture implementing a platform 1700 for managing scholarship applications. The high-level architecture includes both hardware and software applications, as well as various data communications channels for communicating data between the various hardware and software components. The platform 1700 may be roughly divided into front-end components 1702 and back-end components 1704. The front-end components 1702 are primarily disposed within an applicant network 1710 including one or more applicants 1712. The applicants 1712 may be located, by way of example rather than limitation, in separate geographic locations from each other, including different areas of the same city, different cities, different states, or even different countries. The front-end components 1702 may include a number of workstations 1728. The workstations 1728, for example, can be local computers located in the various locations 1712 throughout the network 1710 and executing various applications for ranking the approvers 104 with respect to preferences of the applicants 102.

Web-enabled devices 1714 (e.g., personal computers, tablets, cellular phones, smart phones, web-enabled televisions, etc.) may be communicatively connected to locations 1712 and the system 1740 through a digital network 1730 or a wireless router 1731, as described below.

Referring now to FIG. 17A, the front-end components 1702, in some embodiments, include a number of facility servers 1726 disposed at the number of locations 1712 instead of, or in addition to, a number of workstations 1728. Each of the locations 1712 may include one or more facility servers 1726 that may facilitate communications between the web-enabled devices 1714 and the back-end components 1704 via a digital network 1730, described below, and between the terminals 1728, 1728A of the locations 1712 via the digital network 1730, and may store information for a number of applicants/approvers/accounts/etc. associated with each facility. Of course, a local digital network 1784 may also operatively connect each of the workstations 1728 to the facility server 1726. Unless otherwise indicated, any discussion of the workstations 1728 also refers to the facility servers 1726, and vice versa. Moreover, environments other than the locations 1712, such as the kiosks, call centers, and Internet interface terminals may employ the workstations 1728, the web-enabled devices 1714, and the servers 1726. As used herein, the term "location" refers to any of these points of contact (e.g., call centers, kiosks, Internet interface terminals, etc.) in addition to the locations 1712, etc. described above.

The front-end components 1702 communicate with the back-end components 1704 via the digital network 1730. One or more of the front-end components 1702 may be excluded from communication with the back-end components 1704 by configuration or by limiting access due to security concerns. For example, the web enabled devices 1714 may be excluded from direct access to the back-end components 1704. In some embodiments, the locations 1712 may communicate with the back-end components via the digital network 1730. In other embodiments, the locations 1712 and web-enabled devices 1714 may communicate with the back-end components 1704 via the same digital network 1730, but digital access rights, IP masking, and other network configurations may deny access of the web-enabled devices 1714. The web-enabled devices may also connect to the network 1730 via the encrypted, wireless router 1731.

The digital network 1730 may be a proprietary network, a secure public Internet, a virtual private network or some other type of network, such as dedicated access lines, plain ordinary telephone lines, satellite links, combinations of these, etc. Where the digital network 1730 includes the Internet, data communication may take place over the digital network 1730 via an Internet communication protocol. In addition to one or more web servers 1790 (described below), the back-end components 1704 may include a central processing system 1740 within a central processing facility. Of course, the locations 1712 may be communicatively connected to different back-end components 1704 having one or more functions or capabilities that are similar to the central processing system 1740. The central processing system 1740 may include processing circuitry (e.g., one or more computer processors) 1762 adapted and configured to execute various software applications and components of the platform 1700, in addition to other software applications, such as a medication management system.

The central processing system 1740, in some embodiments, further includes a database 1746 (which may include one or more databases). The database 1746 can be adapted to store data related to the operation of the platform 1700. The central processing system 1740 may access data stored in the database 1746 when executing various functions and tasks associated with the operation of the platform 1700.

Although the platform 1700 is shown to include a central processing system 1740 in communication with three locations 1712, and various web-enabled devices 1714 it should be understood that different numbers of processing systems, locations, and devices may be utilized. For example, the digital network 1730 (or other digital networks, not shown)

may interconnect the platform 1700 to a number of included central processing systems 1740, hundreds of locations 1712, and thousands of web-enabled devices 1714. According to the disclosed example, this configuration may provide several advantages, such as, for example, enabling near real-time uploads and downloads of information as well as periodic uploads and downloads of information. This provides for a primary backup of all the information generated in the wireless data transfer process. Alternatively, some of the locations 1712 may store data locally on the facility server 1726 and/or the workstations 1728.

FIG. 17A also depicts one possible embodiment of the central processing system 1740. The central processing system 1740 may have a controller 1755 operatively connected to the database 1746 via a link 1756 connected to an input/output (I/O) circuit 1766. It should be noted that, while not shown, additional databases may be linked to the controller 1755 in a known manner.

The controller 1755 includes a program memory 1760, the processing circuitry 1762 (may be called a microcontroller or a microprocessor), a random-access memory (RAM) 1764, and the input/output (I/O) circuit 1766, all of which are interconnected via an address/data bus 1765. It should be appreciated that although only one microprocessor 1762 is shown, the controller 1755 may include multiple microprocessors 1762. Similarly, the memory of the controller 1755 may include multiple RAMs 1764 and multiple program memories 1760. Although the I/O circuit 1766 is shown as a single block, it should be appreciated that the I/O circuit 1766 may include a number of different types of I/O circuits. The RAM(s) 1764 and the program memories 1760 may be implemented as semiconductor memories, magnetically readable memories, and/or optically readable memories, for example. A link 1735 may operatively connect the controller 1755 to the digital network 1730 through the I/O circuit 1766.

FIG. 17B depicts one possible embodiment of the front-end components 1702 located in one or more of the locations 1712 from FIG. 17A. Although the following description addresses the design of the locations 1712, it should be understood that the design of one or more of the locations 1712 may be different from the design of others of the locations 1712. Also, each of the locations 1712 may have various different structures and methods of operation. It should also be understood that while the embodiment shown in FIG. 17B illustrates some of the components and data connections that may be present in a location 1712, it does not illustrate all of the data connections that may be present in a location 1712. For exemplary purposes, one design of a location is described below, but it should be understood that numerous other designs may be utilized.

Each of the locations 1712, as illustrated, has one or more portable computing devices 1733 (e.g., notebook computers, tablet computers, smart phones, personal data assistants, etc.) and/or a facility server 1726. The digital network 1784 and wireless router 1731 operatively connect the facility server 1726 to the number of portable computing devices 1733 and/or to other web-enabled devices 1714 and workstations 1728. The digital network 1730 may be a wide area network (WAN), a local area network (LAN), or any other type of digital network readily known to those persons skilled in the art. The digital network 1730 may operatively connect the facility server 1726, the portable computing devices 1733, the workstations 1728, and/or the other web-enabled devices 1714 to the central processing system 1740.

Each portable computing device 1733, workstation 1728, applicant device terminal 1728a, or facility server 1726 includes a controller 1770, as depicted in FIG. 17B in relation to the server 1726. Similar to the controller 1755 from FIG. 17A, the controller 1770 includes a program memory 1772, processing circuitry (e.g., one or more microcontrollers or microprocessors) 1774, a random-access memory (RAM) 1776, and an input/output (110) circuit 1780, all of which are interconnected via an address/data bus 1778. In some embodiments, the controller 1770 may also include, or otherwise be communicatively connected to, a database 1782. The database 1782 (and/or the database 1746 of FIG. 17A) includes data such as the types of data stored in the data repository 114 (FIG. 1) described previously. As discussed with reference to the controller 1755, it should be appreciated that although FIG. 17B depicts only one microprocessor 1774, the controller 1770 may include multiple microprocessors 1774. Similarly, the memory of the controller 1770 may include multiple RAMs 1776 and multiple program memories 1772. Although the FIG. 17B depicts the I/O circuit 1780 as a single block, the I/O circuit 1780 may include a number of different types of I/O circuits. The controller 1770 may implement the RAM(s) 1776 and the program memories 1772 as semiconductor memories, magnetically readable memories, and/or optically readable memories, for example.

Either or both of the program memories 1760 (FIG. 17A) and 1772 may also contain machine-readable instructions (i.e., software) 1771, for execution within the processing circuitry 1762 (FIG. 17A) and 1774, respectively. The software 1771 may perform the various tasks associated with operation of the location or locations, and may be a single module 1771 or a number of modules 1771a, 1771b. While the software 1771 is depicted in FIGS. 17A and 17B as including two modules, 1771a and 1771b, the software 1771 may include any number of modules accomplishing tasks related to location operation.

In addition to the controller 1770, the portable computing devices 1733, the workstations 1728 and the other web-enabled devices 1714 may further include a display and a keyboard as well as a variety of other input/output devices (not shown) such as a scanner, printer, mouse, touch screen, track pad, track ball, isopoint, voice recognition system, digital camera, bar code scanner, RFID reader, etc. An applicant 102 or approver 104 may sign on and occupy each portable computing device 1733, workstation 1728 or applicant device terminal 1728a to assist the employee in performing his or her duties. Employees may sign onto the portable computing device 1733, workstation 1728 or the applicant device terminal 1728a using any available technique, such as entering a user name and password. If an employee signs on to the system using a portable computing device 1733, the network 1784 communicates this information to the facility server 1726, so that the controller 1770 may identify which employees are signed onto the platform 1700 and which portable computing device 1733, workstation 1728 or applicant device terminal 1728a the employee is signed onto.

Various software applications resident in the front-end components 1702 and the back-end components 1704 implement functions related to location operation, and provide various user interface means to allow users (e.g., brokers) to access the platform 1700. One or more of the front-end components 1702 and/or the back-end components 1704 may include a user-interface application 1711 for allowing a user to input and view data associated with the platform 1700, and to interact with the platform described herein. In one embodiment, the user interface application 1711 is a web browser applicant, and the facility server 1726 or the central processing system 1740 implements a server application 1713 for providing data to the user interface application 1711. However, the user interface application 1711 may be any type of interface, including a proprietary interface, and may communicate with the facility server 1726 or the central processing system 1740 using any type of protocol including, but not limited to, file transfer protocol (FTP), telnet, hypertext-transfer protocol (HTTP), etc. Moreover, some embodiments may include the user interface application 1711 running on one of the web-enabled devices 1714, while other embodiments may include the application 1711 running on the portable computing device 1733 in a location 1712. The central processing system 1740 and/or the facility server 1726 may implement any known protocol compatible with the user-interface application 1711 running on the portable computing devices 1733, the workstations 1728 and the web-enabled devices 1714 and adapted to the purpose of receiving and providing the necessary information during the data transfer process.

Figure 17C:
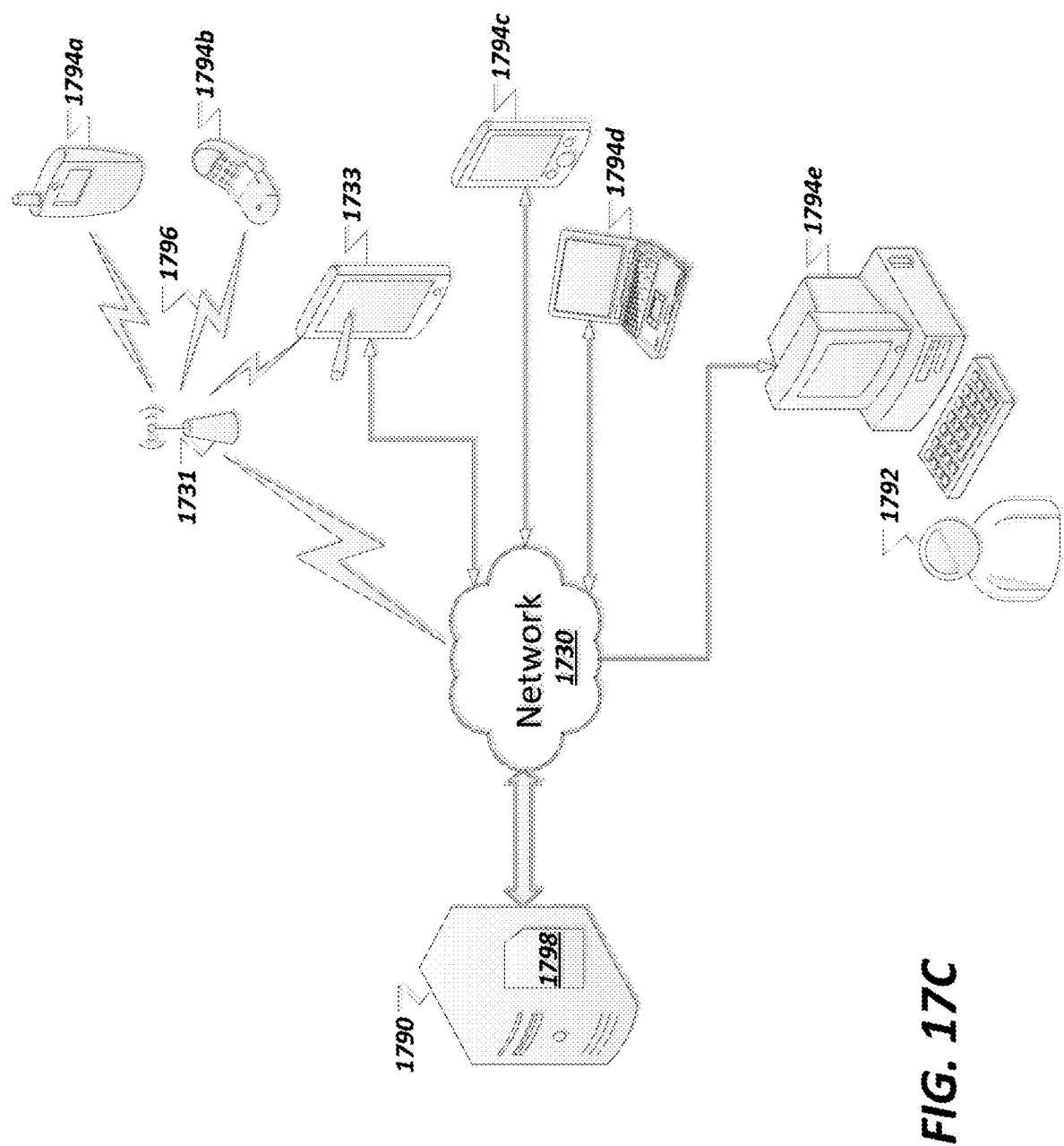
FIGS. 17C and 17D illustrate an example server interface for connecting user computing devices within a platform for automated management of scholarship applications.

For purposes of implementing the platform 1700, the user interacts with location systems (e.g., the central processing system 1740) via a number of web pages. FIG. 17C depicts a web server 1790 connected via the network 1730 to a number of portable computing devices 1733 and other web-enabled devices through which a user 1792 may initiate and interact with the platform 1700. The web enabled devices may include, by way of example, a smart-phone 1794*a*, a web-enabled cell phone 1794*b*, a tablet computer 1733, a personal digital assistant (PDA) 1794*c*, a laptop computer 1794*d*, a desktop computer 1794*e*, a portable media player (not shown), etc. Of course, any web-enabled device appropriately configured may interact with the platform 1700. The web-enabled devices 1733 and 1794 need not necessarily communicate with the network 1730 via a wired connection. In some instances, the web enabled devices 1733 and 1794 may communicate with the network 1730 via wireless signals 1796 and, in some instances, may communicate with the network 1730 via an intervening wireless or wired device 1731, which may be a wireless router, a wireless repeater, a base transceiver station of a mobile telephony provider, etc. Each of the web-enabled devices 1733 and 1794 may interact with the web server 1790 to receive web pages, such as the web page 1798 depicted in FIG. 17C, for display on a display associated with the web-enabled device 1733 and 1794. It will be appreciated that although only one web server 1790 is depicted in FIG. 17C, multiple web servers 1790 may be provided for the purpose of distributing server load, serving different web pages, implementing different portions of the location web interface, etc.

Figure 17D:
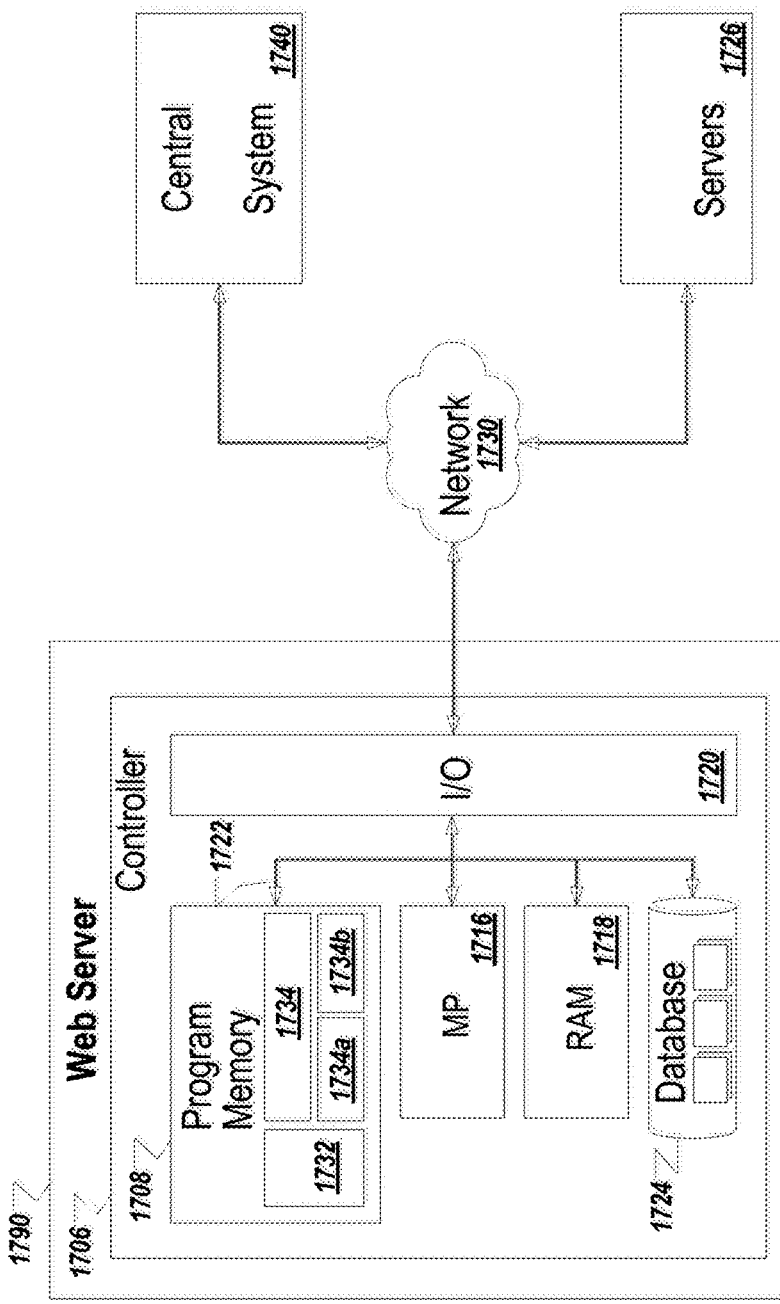

Turning now to FIG. 17D, the web server 1790, like the facility server 1726, includes a controller 1706. Similar to the controllers 1755 and 1770, the controller 1706 includes a program memory 1708, processing circuitry (e.g., one or more microcontrollers or microprocessors) 1716, a random-access memory (RAM) 1718, and an input/output (I/O) circuit 1720, all of which are interconnected via an address/data bus 1722. In some embodiments, the controller 1706 may also include, or otherwise be communicatively connected to, a database 1724 or other data storage mechanism (e.g., one or more hard disk drives, optical storage drives, solid state storage devices, etc.). The database 1724 may include data such as scholarship institution web profiles, product data, web page templates and/or web pages, and other data necessary to interact with the user 1792 through the network 1730. As discussed with reference to the controllers 1755 and 1770, it should be appreciated that although FIG. 17D depicts only one microprocessor 1716, the controller 1706 may include multiple microprocessors 1716. Similarly, the memory of the controller 1706 may include multiple RAMs 1718 and multiple program memories 1708. Although the FIG. 17D depicts the I/O circuit 1720 as a single block, the I/O circuit 1720 may include a number of different types of I/O circuits. The controller 1706 may implement the RAM(s) 1718 and the program memories 1708 as semiconductor memories, magnetically readable memories, and/or optically readable memories, for example.

In addition to being connected through the network 1730 to the user devices 1733 and 1794, as depicted in FIG. 17C, FIG. 17D illustrates that the web server 1790 may also be connected through the network 1730 to the central processing system 1740 and/or one or more facility servers 1726. As described below, connection to the central processing system 1740 and/or to the one or more facility servers 1726 facilitates the platform 1700.

The program memory 1708 and/or the RAM 1718 may store various applications for execution by the processing circuitry 1716. For example, an application 1732 may provide a user interface to the server, which user interface may, for example, allow a network administrator to configure, troubleshoot, or test various aspects of the server's operation, or otherwise to access information thereon. A server application 1734 operates to populate and transmit web pages to the web-enabled devices 1794, receive information from the user 1792 transmitted back to the server 1790, and forward appropriate data to the central processing system 1740 and the facility servers 1726, as described below Like the software 1771, the server application 1734 may be a single module 1734 or a number of modules 1734*a*, 1734*b*. While the server application 1734 is depicted in FIG. 17D as including two modules, 1734*a* and 1734*b*, the server application 1734 may include any number of modules accomplishing tasks related to implantation of the web server 1790. By way of example, the module 1734*a* may populate and transmit the web pages and/or may receive and evaluate inputs from the user 1792 to facilitate in the wireless transfer of data from a first tablet to a second tablet, while the module 1734*b* may communicate with one or more of the back end components to provide the requested data.

Typically, a user may launch or instantiate a user interface application (e.g., a web browser or other applicant application) from a web-enabled device, such as the web-enabled devices 1733 and 1794, to access the web server 1790 cooperating with the system 1740 to implement the platform 1700.

One or more processors can be utilized to implement any functions and/or algorithms described herein, unless explicitly stated otherwise. Additionally, any functions and/or algorithms described herein, unless explicitly stated otherwise, can be performed upon virtual processing circuitry (e.g., one or more virtual processors, for example on one or more physical computing systems such as a computer farm or a cloud drive).

Reference has been made to flowchart illustrations and block diagrams of methods, systems and computer program products according to implementations of this disclosure. Aspects thereof are implemented by computer program instructions. These computer program instructions may be provided to processing circuitry of a general purpose computer, special purpose computer, or other programmable data processing apparatus to produce a machine, such that the instructions, which execute via the processing circuitry of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The implementations described herein are directed to a scholarship management system 108 that significantly improves the technology of systems and devices that manage the approval of scholarships by a scholarship-awarding institution. Being able to process scholarship applications in real-time, automatically determine an applicant quality score that provides an indication of whether the applicant is a good candidate for the scholarship, and manage the flow of applications through the approvers, the scholarship management system 108 is fully automated and improves the efficiency of how the processing engines and data repositories interact with each other. The automatically triggering of the processing engines during execution of the processes of the scholarship management system 108 increases the amount of processing that is done by the system 108 without any type of human interaction. Also, identifying potential applicants for the scholarships and automatically flagging interested potential applicants for expedited processing allows the best applicants to be awarded scholarships in a more efficient manner.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processing circuitry (e.g., processors and/or programmable circuits) configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A system for real-time scholarship application, review and award, comprising:
   one or more servers, each including:
      processing circuitry including:
         a first correlation register configured to store a first vector, and
         a second correlation register configured to store a second vector, and
         a non-transitory computer readable medium coupled to the processing circuitry storing machine-executable instructions; and
      a memory;
   a network; and
   a plurality of internal computing devices, at least one external entity computing device, at least one display computing device, and at least one approver computing device each in communication, via the network, with at least a first server of the one or more servers; each internal computing device inputting a scholarship application including a title of a proposed scholarship wherein instructions, when executed by the processing circuitry, cause the processing circuitry to:
   acquire, in real-time in response to determining that a first application window for a scholarship has opened, a prioritization matrix for the scholarship including one or more entries associated with ideal characteristics of one or more potential scholarship applicants, including characteristics of the scholarship type, scholarship applicant criteria of the potential scholarship applicant who may be considered a good candidate for approval, and store the prioritization matrix in the first correlation register, the prioritization matrix including prioritization matrix data stored in a data repository;
   acquire a plurality of applications for the scholarship from a plurality of internal applicants for the scholarship, from the plurality of internal computing devices, wherein the internal applicants are in an applicant network that is distributed over an international geographic area, wherein the application for the scholarship includes one or more first applicant attributes;
   acquire one or more inputs, from the at least one external entity computing device, from one or more external entities distributed over an international geographic area, wherein the inputs include one or more second applicant attributes of the internal applicant for the scholarship and a portion of the prioritization matrix data;
   generate, in real-time in response to receiving the plurality of applications for the scholarships from the plurality of internal computing devices, an applicant attribute vector characterizing the first and second applicant attributes of the internal applicant extracted from the application that is stored in the second correlation register;
   calculate, in real-time, an applicant quality score (AQS) for each of the received applications based on the respective prioritization matrix, by calculating for each AQS a product for each entry of the prioritization matrix by multiplying corresponding entries of the prioritization matrix and the applicant attribute vector;
   apply a weighting factor to the product for each entry of the prioritization matrix resulting in weighted products for each entry of the prioritization matrix, accumulate the weighted products into the applicant quality score indicating an amount of correlation between the prioritization matrix and the applicant attribute vector;
   generate, in real-time, in response to calculating the applicant quality score, an automatic scholarship prediction indicating a probability that the internal applicant is awarded the scholarship by comparing the applicant quality score to at least an average applicant quality score for the scholarship during a previous scholarship cycle;
   provide the automatic scholarship prediction to the internal applicant in real time;
   construct an enhanced data packet as a command to perform a routing process, wherein the enhanced data packet condenses the applicant attribute vectors, the prioritization matrix, and the applicant quality score;

automatically route the enhanced data packet to one or more approvers over the at least one approver computing device;

output, in real time on the approver computing device, an approver interface to display at least one of the applicant attribute vector, the prioritization matrix, or the applicant quality score;

approve the internal applicant, over the at least one approver computing device and the plurality of internal computing devices, for the scholarship when the approver awards the scholarship to the internal applicant for the scholarship;

transmit, to the internal computing device, a scholarship award decision with an approver digital signature to the internal applicant; and calculate, by the processing circuitry, in response to receiving a final award decision, a remaining scholarship budget from a starting scholarship budget stored in the memory.

2. The system of claim 1, wherein the instructions, when executed by the processing circuitry, further cause the processing circuitry to:

identify the internal applicant for the scholarship based on a calculated preliminary applicant quality score indicating an amount of correlation between a preliminary applicant attribute vector and a preliminary prioritization matrix.

3. The system of claim 2, wherein identifying the internal applicant for the scholarship further includes:

preparing, for presentation to the internal applicant via the at least one internal computing device, a first graphical user interface for selection of a level of interest of the internal applicant in applying for the scholarship;

providing, via the network to the plurality of internal computing devices, the first graphical user interface; and receiving, from the internal applicants via the plurality of internal computing devices and the first graphical user interface, the level of interest in applying for the scholarship.

4. The system of claim 3, further comprising:

prioritizing routing of the application for scholarship from the internal applicant that have indicated a predetermined level of interest in applying for the scholarship by routing the application for scholarship through an approval chain prior to a closing of the first application window, wherein the approval chain includes the at least one approver computing device.

5. The system of claim 1, wherein acquiring the prioritization matrix further includes updating a previous prioritization matrix for the scholarship from a previous application cycle based on keyword data extracted from one or more external data sources.

6. The system of claim 5, wherein acquiring the prioritization matrix further includes determining weighting factors for each entry of the prioritization matrix based on the keyword data extracted from the one or more external data sources.

7. The system of claim 1, wherein the instructions, when executed by the processing circuitry, further cause the processing circuitry to:

route, in response to determining that the first application window has closed, one or more received applications with corresponding applicant quality scores through an approval chain.

8. The system of claim 7, wherein routing the one or more received applications with corresponding applicant quality scores through the approval chain further includes:

preparing, for presentation to a user via the computing device, a second graphical user interface for selection of a scholarship award decision and a scholarship award amount;

providing, via the network to the computing device, the second graphical user interface; and receiving, from the user via the second graphical user interface, the scholarship award decision and the scholarship award amount.

9. The system of claim 8, wherein preparing the second graphical user interface further includes determining one or more previous scholarship statistics for a previous scholarship cycle including at least one of a number of scholarships awarded, an average amount awarded per scholarship, a highest award amount, or a lowest award amount.

10. The system of claim 8, wherein preparing the second graphical user interface further includes determining one or more current scholarship statistics including at least one of a number of scholarships awarded, an average amount awarded per scholarship, a highest award amount, a lowest award amount, a remaining award amount, or a number of remaining scholarships to award.

11. The system of claim 1, wherein calculating the remaining scholarship budget includes allocating the remaining scholarship budget to an additional application window when the remaining scholarship budget is greater than a predetermined threshold amount.

12. The system of claim 1, wherein the instructions, when executed by the processing circuitry, further cause the processing circuitry to:

preparing, for presentation to a user via the computing device, a third graphical user interface for submitting a scholarship modification request that includes a type of request and a statement of a reason for the scholarship modification request;

providing, via the network to the computing device, the third graphical user interface; and receiving, from the user via the third graphical user interface, the type of request and the statement of reason for the scholarship modification request.

13. The system of claim 12, wherein the instructions, when executed by the processing circuitry, further cause the processing circuitry to:

automatically approve the scholarship modification request in response to determining that the scholarship modification request is within predetermined scholarship terms.

14. The system of claim 12, wherein instructions, when executed by the processing circuitry, further cause the processing circuitry to:

automatically route the scholarship modification request through the approval chain in response to determining that the scholarship modification request is not within predetermined scholarship terms.

15. The system of claim 1, wherein the instructions, when executed by the processing circuitry, further cause the processing circuitry to transfer scholarship funds from a university to the internal applicant after receiving the final award decision.

16. The system of claim 1, wherein the instructions, when executed by the processing circuitry, further cause the processing circuitry to output to the internal applicant for the scholarship a scholarship interest inquiry via a text message to the at least one internal computing device.

17. The system of claim 1, wherein the instructions, when executed by the processing circuitry, further cause the processing circuitry to:
trigger the generation of the applicant attribute vector after acquiring the application for the scholarship from the internal applicant or the inputs from the external entity.

18. The system of claim 1, wherein the application for the scholarship is acquired in a first format, the inputs from the external entity are acquired in a second format and the prioritization matrix is acquired in a third format, and
wherein at least one of the first format and the second format is different from the third format, and wherein the instructions, when executed by the processing circuitry, further cause the processing circuitry to:
normalize the second format and/or the first format with the third format.

19. The system of claim 1, wherein before acquiring the application for the scholarship, the instructions, when executed by the processing circuitry, further cause the processing circuitry to:
acquire a preliminary prioritization matrix for the scholarship including one or more entries associated with ideal characteristics of one or more potential scholarship applicants, the preliminary prioritization matrix including preliminary prioritization matrix data;
acquire potential applicant attribute data from a database of potential applicants from the data repository,
generate a plurality of preliminary applicant attribute vectors characterizing the applicant attribute data of each of the potential applicants;
for each of the potential applicants, calculate a product of the preliminary prioritization matrix by multiplying corresponding entries of the preliminary prioritization matrix and each of the preliminary applicant attribute vectors;
apply a weighting factor to the product for each entry of the preliminary prioritization matrix resulting in weighted products for each entry of the preliminary prioritization matrix;
accumulate the weighted products into a potential applicant quality score indicating an amount of correlation between the preliminary prioritization matrix and each of the preliminary applicant attribute vectors;
rank the potential applicants numerically according to the potential applicant quality score of each of the potential applicants.

20. A method for real-time scholarship application, review and award, comprising:
acquiring, by processing circuitry of a central computing system, a prioritization matrix for a scholarship including one or more entries associated with ideal characteristics of potential scholarship applicants in real-time in response to determining that a first application window for the scholarship has opened, the prioritization matrix including prioritization matrix data stored in a data repository of the central computing system, the ideal characteristics of the scholarship type, scholarship applicant criteria of the potential scholarship applicant who may be considered a good candidate for approval;
acquiring, by processing circuitry of the central computing system, a plurality of applications for the scholarship from a plurality of internal computing devices of an internal applicant for the scholarship in an applicant network that is distributed over an international geographic area, wherein the application for the scholarship includes one or more first applicant attributes;
acquiring, by processing circuitry of the central computing system, one or more inputs from an external entity computing device of an external entity in an entity network distributed over an international geographic area, wherein the inputs include one or more second applicant attributes of the scholarship applicant and a portion of the prioritization matrix data;
generating, by the processing circuitry of the central computing system, an applicant attribute vector characterizing the first and second applicant attributes of the internal applicant extracted from the application for the scholarship in real-time in response to receiving the plurality of applications for the scholarships from the internal applicants over the plurality of internal computing devices that is stored in a first correlation register and/or in response to receiving the inputs from the external entity;
calculating, in real-time by the processing circuitry of the central computing system, an applicant quality score (AQS) for each of the received applications based on the respective prioritization matrix, by calculating for each AQS a product for each entry of the prioritization matrix by multiplying corresponding entries of the prioritization matrix and the applicant attribute vector that is stored in a second correlation register;
applying, by the processing circuitry of the central computing system, a weighting factor to the product for each entry of the prioritization matrix resulting in weighted products for each entry of the prioritization matrix;
accumulating, by the processing circuitry of the central computing system, the weighted products into an applicant quality score indicating an amount of correlation between the prioritization matrix and the applicant attribute vector;
generating, in real-time by the processing circuitry of the central computing system in response to calculating the applicant quality score, an automatic scholarship prediction indicating a probability that the internal applicant is awarded the scholarship by comparing the applicant quality score to at least an average applicant quality score for the scholarship during a previous scholarship cycle;
providing the automatic scholarship prediction to the internal applicant in real time;
construct an enhanced data packet as a command to perform a routing process, wherein the enhanced data packet condenses the applicant attribute vectors, the prioritization matrix, or the applicant quality score;
automatically route the enhanced data packet to one or more approvers over the at least one approver computing device;
outputting, in real-time on the approver computing device, an approver interface to display at least one of the applicant attribute vector, the prioritization matrix, or the applicant quality score;
approving the internal applicant, over the approver computing device, for the scholarship when the approver awards the scholarship to the internal applicant for the scholarship;

transmitting, by the processing circuitry of the central computing system, a scholarship award decision with an approver digital signature to the internal applicant; and calculating, by the processing circuitry of the one central computing system, a remaining scholarship budget in response to receiving a final award decision.

21. The method of claim 20, wherein the applicant quality score is obtained by multiplying adjacent attributes of the applicant attribute vector and the prioritization matrix, then summing the products of all the multiplications, then circular shifting the applicant attribute vector until all adjacent pairs have been multiplied and summed to obtain a cumulative output, then comparing the cumulative output with a maximum output obtained by maximally weighting all of the attributes to determine a fraction of the cumulative output based on the maximum output, and displaying the fraction as the applicant quality score.

* * * * *